United States Patent
Nakamura et al.

(10) Patent No.: US 7,941,811 B2
(45) Date of Patent: May 10, 2011

(54) DATA PROCESSING DEVICE AND DATA PROCESSING METHOD

(75) Inventors: Tadahiro Nakamura, Yokohama (JP); Norihisa Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 11/688,184

(22) Filed: Mar. 19, 2007

(65) Prior Publication Data
US 2007/0288544 A1    Dec. 13, 2007

(30) Foreign Application Priority Data

Mar. 29, 2006 (JP) ................ 2006-091232
Dec. 14, 2006 (JP) ................ 2006-337160

(51) Int. Cl.
*G06F 3/00* (2006.01)
*G06F 17/30* (2006.01)

(52) U.S. Cl. ........................ 719/318; 707/812

(58) Field of Classification Search .............. 719/318; 707/812
See application file for complete search history.

(56) References Cited

U.S. PATENT DOCUMENTS

| 6,085,191 | A | * | 7/2000 | Fisher et al. | 707/737 |
| 6,734,985 | B1 | | 5/2004 | Ochiai | |
| 7,188,224 | B2 | * | 3/2007 | Ohta et al. | 711/163 |
| 7,308,478 | B2 | * | 12/2007 | Kawaguchi et al. | 709/206 |
| 2004/0034620 | A1 | * | 2/2004 | Kataoka | 707/1 |

FOREIGN PATENT DOCUMENTS

| JP | 11-203094 A | 7/1999 |
| JP | 2000-137585 A | 5/2000 |

* cited by examiner

*Primary Examiner* — Sough Hyung
*Assistant Examiner* — Lechi Truong
(74) *Attorney, Agent, or Firm* — Canon USA, Inc. IP Division

(57) ABSTRACT

A data processing device includes a notified party storage unit for storing a party notified of information on the data processing device; a notification unit for notifying each notified party of the information on the data processing device; a reception unit for receiving from an information processing apparatus a registration request for requiring notified party registration to the notified party storage unit; and a setting unit for setting at least one of the information processing devices as a specific information processing device, in which the notified party storage unit stores the notified party such that the number of the notified parties registered according to the registration request from information processing device that is not the specific information processing device does not exceed a predetermined number among the number of the notified parties that can be stored in the notified party storage unit.

13 Claims, 28 Drawing Sheets

FIG. 5

```
<Envelope>
 <Body>
  <Notification>
   <DeviceStateChanged>
    <State>Paper Jam</State>
   </DeviceStateChanged>
  </Notification>
 </Body>
</Envelope>
```

FIG. 6

REGISTRATION ID: 1
NOTIFIED PARTY ADDRESS: http://192.168.01/EventSink
NOTIFICATION CONDITION: DeviceStateChanged
VALIDITY PERIOD: 10 MINUTES

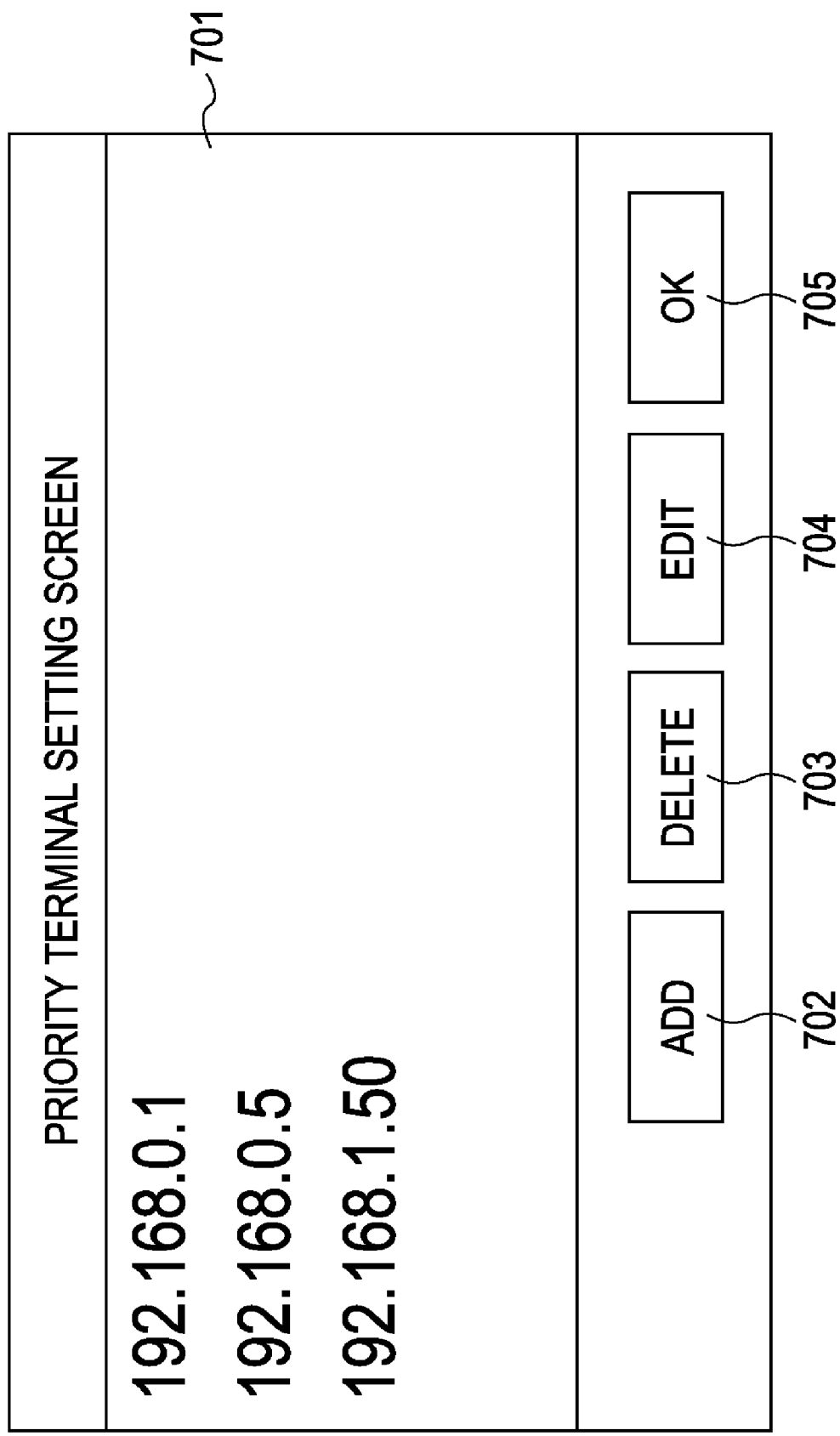

FIG. 8

| REGISTRATION ID: 1<br>NOTIFIED PARTY ADDRESS:<br>NOTIFICATION CONDITION:<br>VALIDITY PERIOD: |
|---|
| REGISTRATION ID: 2<br>NOTIFIED PARTY ADDRESS:<br>NOTIFICATION CONDITION:<br>VALIDITY PERIOD: |

} 801

| REGISTRATION ID: 3<br>NOTIFIED PARTY ADDRESS:<br>NOTIFICATION CONDITION:<br>VALIDITY PERIOD: |
|---|
| REGISTRATION ID: 4<br>NOTIFIED PARTY ADDRESS:<br>NOTIFICATION CONDITION:<br>VALIDITY PERIOD: |
| REGISTRATION ID: 5<br>NOTIFIED PARTY ADDRESS:<br>NOTIFICATION CONDITION:<br>VALIDITY PERIOD: |
| REGISTRATION ID: 6<br>NOTIFIED PARTY ADDRESS:<br>NOTIFICATION CONDITION:<br>VALIDITY PERIOD: |

```
<Envelope>
 <Body>
  <Subscribe>
   <Delivery>
    <NotifyTo>
     <Address>http://192.168.0.1/MyEventSink</Address>   ~ 901
     <ReferenceProperties>
      <MySubscription>2597</MySubscription>
     </ReferenceProperties>
    </NotifyTo>
   </Delivery>
   <Expires>PT10M</Expires>   ~ 903
   <Filter>DeviceStateChanged</Filter>   ~ 902
  </Subscribe>
 </Body>
</Envelope>
```

FIG. 10

```
<Envelope>
 <Body>
  <SubscribeResponse>
   <SubscriptionManager>
    <Address>http://192.168.0.100/SubscriptionManager</Address>
    <ReferenceParameters>
     <Identifier>1</Identifier>   ~ 1001
    </ReferenceParameters>
   </SubscriptionManager>
   <Expires>PT10M</Expires>   ~ 1002
  </SubscribeResponse>
 </Body>
</Envelope>
```

FIG. 11

REGISTRATION ID: 1
NOTIFIED PARTY ADDRESS: http://192.168.02/EventSink
NOTIFICATION CONDITION: DeviceStateChanged
VALIDITY PERIOD: 10 MINUTES REGISTRATION ID: 2
NOTIFIED PARTY ADDRESS:
NOTIFICATION CONDITION:
VALIDITY PERIOD:

⎫ 801

REGISTRATION ID: 3
NOTIFIED PARTY ADDRESS:http://192.168.03/EventSink
NOTIFICATION CONDITION: DeviceStateChanged
VALIDITY PERIOD: 20 MINUTES REGISTRATION ID: 4
NOTIFIED PARTY ADDRESS: http://192.168.04/EventSink
NOTIFICATION CONDITION: DeviceStateChanged
VALIDITY PERIOD: 60 MINUTES REGISTRATION ID: 5
NOTIFIED PARTY ADDRESS: http://192.168.05/EventSink
NOTIFICATION CONDITION: DeviceStateChanged
VALIDITY PERIOD: 10 MINUTES REGISTRATION ID: 6
NOTIFIED PARTY ADDRESS: http://192.168.06/EventSink
NOTIFICATION CONDITION: DeviceStateChanged
VALIDITY PERIOD: 15 MINUTES

⎫ 802

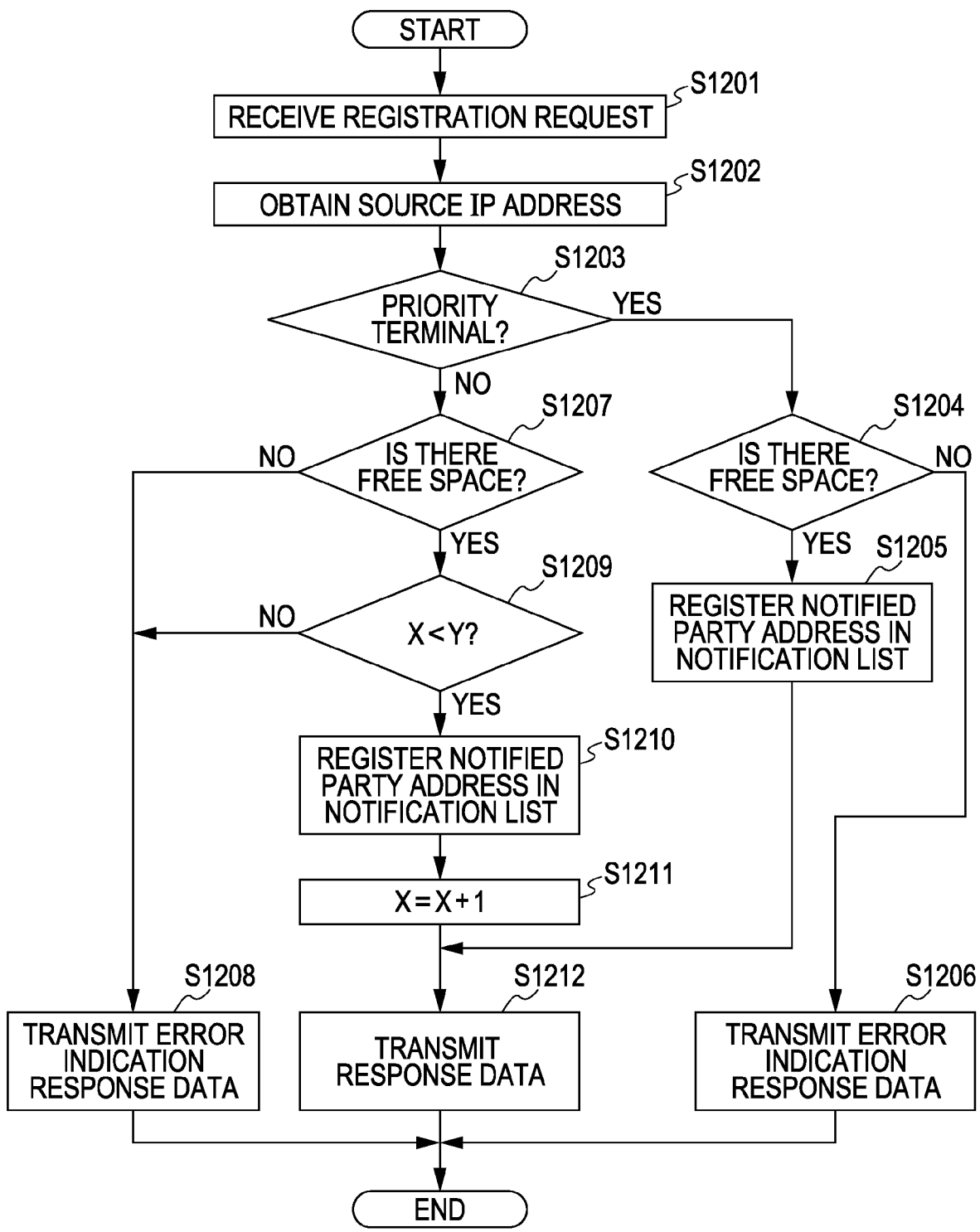

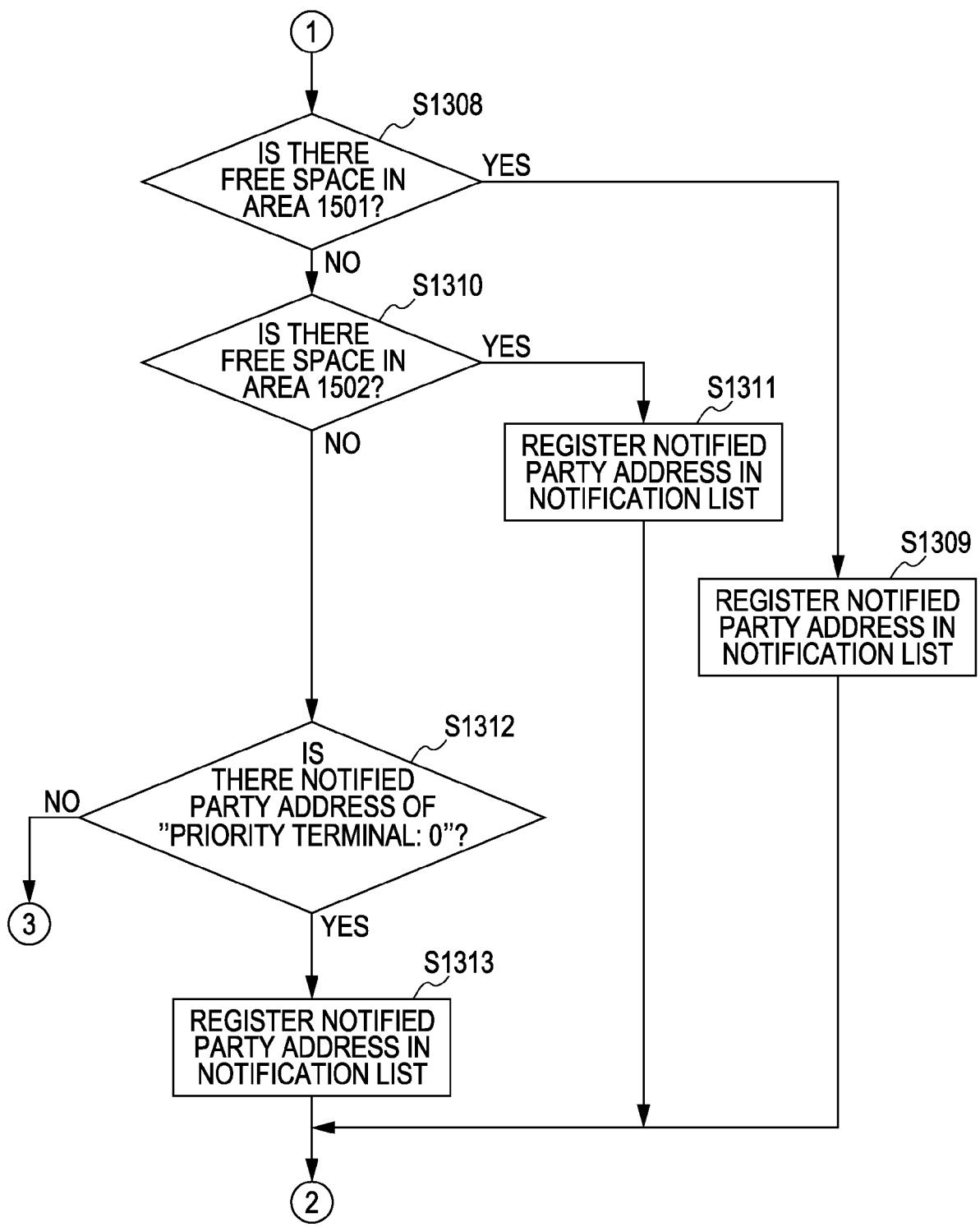

FIG. 15

```
REGISTRATION ID: 1
NOTIFIED PARTY ADDRESS:
NOTIFICATION CONDITION:
VALIDITY PERIOD:
PRIORITY TERMINAL:
```
```
REGISTRATION ID: 2
NOTIFIED PARTY ADDRESS:
NOTIFICATION CONDITION:
VALIDITY PERIOD:
PRIORITY TERMINAL:
```
⎫ 1501

```
REGISTRATION ID: 3
NOTIFIED PARTY ADDRESS:
NOTIFICATION CONDITION:
VALIDITY PERIOD:
PRIORITY TERMINAL:
```
```
REGISTRATION ID: 4
NOTIFIED PARTY ADDRESS:
NOTIFICATION CONDITION:
VALIDITY PERIOD:
PRIORITY TERMINAL:
```
```
REGISTRATION ID: 5
NOTIFIED PARTY ADDRESS:
NOTIFICATION CONDITION:
VALIDITY PERIOD:
PRIORITY TERMINAL:
```
```
REGISTRATION ID: 6
NOTIFIED PARTY ADDRESS:
NOTIFICATION CONDITION:
VALIDITY PERIOD:
PRIORITY TERMINAL:
```
⎫ 1502

FIG. 16

| REGISTRATION ID: 1
NOTIFIED PARTY ADDRESS: http://192.168.02/EventSink
NOTIFICATION CONDITION: DeviceStateChanged
VALIDITY PERIOD: 10 MINUTES
PRIORITY TERMINAL: 1 |
| REGISTRATION ID: 2
NOTIFIED PARTY ADDRESS: http://192.168.07/EventSink
NOTIFICATION CONDITION: DeviceStateChanged
VALIDITY PERIOD: 10 MINUTES
PRIORITY TERMINAL: 1 |

} 1501

| REGISTRATION ID: 3
NOTIFIED PARTY ADDRESS: http://192.168.03/EventSink
NOTIFICATION CONDITION: DeviceStateChanged
VALIDITY PERIOD: 20 MINUTES
PRIORITY TERMINAL: 0 |
| REGISTRATION ID: 4
NOTIFIED PARTY ADDRESS: http://192.168.04/EventSink
NOTIFICATION CONDITION: DeviceStateChanged
VALIDITY PERIOD: 60 MINUTES
PRIORITY TERMINAL: 0 |
| REGISTRATION ID: 5
NOTIFIED PARTY ADDRESS: http://192.168.05/EventSink
NOTIFICATION CONDITION: DeviceStateChanged
VALIDITY PERIOD: 10 MINUTES
PRIORITY TERMINAL: 0 |
| REGISTRATION ID: 6
NOTIFIED PARTY ADDRESS: http://192.168.06/EventSink
NOTIFICATION CONDITION: DeviceStateChanged
VALIDITY PERIOD: 15 MINUTES
PRIORITY TERMINAL: 0 |

| |
|---|
| REGISTRATION ID: 1<br>NOTIFIED PARTY ADDRESS:<br>NOTIFICATION CONDITION:<br>VALIDITY PERIOD:<br>PRIORITY LEVEL: |
| REGISTRATION ID: 2<br>NOTIFIED PARTY ADDRESS:<br>NOTIFICATION CONDITION:<br>VALIDITY PERIOD:<br>PRIORITY LEVEL: |
| REGISTRATION ID: 3<br>NOTIFIED PARTY ADDRESS:<br>NOTIFICATION CONDITION:<br>VALIDITY PERIOD:<br>PRIORITY LEVEL: |
| REGISTRATION ID: 4<br>NOTIFIED PARTY ADDRESS:<br>NOTIFICATION CONDITION:<br>VALIDITY PERIOD:<br>PRIORITY LEVEL: |
| REGISTRATION ID: 5<br>NOTIFIED PARTY ADDRESS:<br>NOTIFICATION CONDITION:<br>VALIDITY PERIOD:<br>PRIORITY LEVEL: |
| REGISTRATION ID: 6<br>NOTIFIED PARTY ADDRESS:<br>NOTIFICATION CONDITION:<br>VALIDITY PERIOD:<br>PRIORITY LEVEL: |

FIG. 21

```
<Envelope>
  <Body>
    <Subscribe>
      <Delivery>
        <NotifyTo>
          <Address>http://192.168.0.1/MyEventSink</Address> ~ 2101
          <ReferenceProperties>
            <MySubscription>2597</MySubscription>
          </ReferenceProperties>
        </NotifyTo>
      </Delivery>
      <Expires>PT10M</Expires> ~ 2103
      <Filter>DeviceStateChanged</Filter> ~ 2102
      <Priority>1</Priority> ~ 2104
    </Subscribe>
  </Body>
</Envelope>
```

FIG. 22

| |
|---|
| REGISTRATION ID: 1<br>NOTIFIED PARTY ADDRESS: http://192.168.02/EventSink<br>NOTIFICATION CONDITION: DeviceStateChanged<br>VALIDITY PERIOD: 10 MINUTES<br>PRIORITY LEVEL: 1 |
| REGISTRATION ID: 2<br>NOTIFIED PARTY ADDRESS: http://192.168.07/EventSink<br>NOTIFICATION CONDITION: DeviceStateChanged<br>VALIDITY PERIOD: 10 MINUTES<br>PRIORITY LEVEL: 1 |
| REGISTRATION ID: 3<br>NOTIFIED PARTY ADDRESS: http://192.168.03/EventSink<br>NOTIFICATION CONDITION: DeviceStateChanged<br>VALIDITY PERIOD: 20 MINUTES<br>PRIORITY LEVEL: 2 |
| REGISTRATION ID: 4<br>NOTIFIED PARTY ADDRESS: http://192.168.04/EventSink<br>NOTIFICATION CONDITION: DeviceStateChanged<br>VALIDITY PERIOD: 60 MINUTES<br>PRIORITY LEVEL: 2 |
| REGISTRATION ID: 5<br>NOTIFIED PARTY ADDRESS: http://192.168.05/EventSink<br>NOTIFICATION CONDITION: DeviceStateChanged<br>VALIDITY PERIOD: 10 MINUTES<br>PRIORITY LEVEL: 2 |
| REGISTRATION ID: 6<br>NOTIFIED PARTY ADDRESS: http://192.168.06/EventSink<br>NOTIFICATION CONDITION: DeviceStateChanged<br>VALIDITY PERIOD: 15 MINUTES<br>PRIORITY LEVEL: 2 |

FIG. 27

| |
|---|
| REGISTRATION ID: 1<br>NOTIFIED PARTY ADDRESS:<br>NOTIFICATION CONDITION:<br>VALIDITY PERIOD:<br>SOURCE ADDRESS: |
| REGISTRATION ID: 2<br>NOTIFIED PARTY ADDRESS:<br>NOTIFICATION CONDITION:<br>VALIDITY PERIOD:<br>SOURCE ADDRESS: |
| REGISTRATION ID: 3<br>NOTIFIED PARTY ADDRESS:<br>NOTIFICATION CONDITION:<br>VALIDITY PERIOD:<br>SOURCE ADDRESS: |
| REGISTRATION ID: 4<br>NOTIFIED PARTY ADDRESS:<br>NOTIFICATION CONDITION:<br>VALIDITY PERIOD:<br>SOURCE ADDRESS: |
| REGISTRATION ID: 5<br>NOTIFIED PARTY ADDRESS:<br>NOTIFICATION CONDITION:<br>VALIDITY PERIOD:<br>SOURCE ADDRESS: |
| REGISTRATION ID: 6<br>NOTIFIED PARTY ADDRESS:<br>NOTIFICATION CONDITION:<br>VALIDITY PERIOD:<br>SOURCE ADDRESS: |

FIG. 28

```
<Envelope>
 <Body>
  <Subscribe>
   <Delivery>
    <NotifyTo>
     <Address>http://192.168.0.1/MyEventSink</Address> ~ 2801
     <ReferenceProperties>
      <MySubscription>2597</MySubscription>
     </ReferenceProperties>
    </NotifyTo>
   </Delivery>
   <Expires>PT10M</Expires> ~ 2802
   <Filter>DeviceStateChanged</Filter> ~ 2803
   <MyAddr>192.168.0.1</MyAddr> ~ 2804
  </Subscribe>
 </Body>
</Envelope>
```

FIG. 29

```
<Envelope>
 <Body>
  <Subscribe>
   <Delivery>
    <NotifyTo>
     <Address>http://192.168.1.3/MyEventSink</Address>
     <ReferenceProperties>
      <MySubscription>2599</MySubscription>
     </ReferenceProperties>
    </NotifyTo>
   </Delivery>
   <Expires>PT10M</Expires>
   <Filter>DeviceStateChanged</Filter>
   <MyAddr>192.168.1.3</MyAddr>
  </Subscribe>
 </Body>
</Envelope>
```

FIG. 30

| |
|---|
| REGISTRATION ID: 1<br>NOTIFIED PARTY ADDRESS: http://192.168.0.1/EventSink<br>NOTIFICATION CONDITION: DeviceStateChanged<br>VALIDITY PERIOD: 9 MINUTES<br>SOURCE ADDRESS: 192.168.0.1 |
| REGISTRATION ID: 2<br>NOTIFIED PARTY ADDRESS: http://192.168.0.2/EventSink<br>NOTIFICATION CONDITION: DeviceStateChanged<br>VALIDITY PERIOD: 10 MINUTES<br>SOURCE ADDRESS: 192.168.0.2 |
| REGISTRATION ID: 3<br>NOTIFIED PARTY ADDRESS: http://192.168.1.3/EventSink<br>NOTIFICATION CONDITION: DeviceStateChanged<br>VALIDITY PERIOD: 10 MINUTES<br>SOURCE ADDRESS: 192.168.1.3 |
| REGISTRATION ID: 4<br>NOTIFIED PARTY ADDRESS: http://192.168.2.4/EventSink<br>NOTIFICATION CONDITION: DeviceStateChanged<br>VALIDITY PERIOD: 10 MINUTES<br>SOURCE ADDRESS: 192.168.2.4 |
| REGISTRATION ID: 5<br>NOTIFIED PARTY ADDRESS: http://192.168.3.5/EventSink<br>NOTIFICATION CONDITION: DeviceStateChanged<br>VALIDITY PERIOD: 10 MINUTES<br>SOURCE ADDRESS: 192.168.3.5 |
| REGISTRATION ID: 6<br>NOTIFIED PARTY ADDRESS: http://192.168.4.6/EventSink<br>NOTIFICATION CONDITION: DeviceStateChanged<br>VALIDITY PERIOD: 10 MINUTES<br>SOURCE ADDRESS: 192.168.4.6 |

DATA PROCESSING DEVICE AND DATA PROCESSING METHOD

BACKGROUND OF THE INVENTION

1. Field of the Invention

The present invention relates to a data processing device for receiving, from an information processing apparatus, a registration request with which the registration of a notified party address is requested and for notifying the notified party address of information related to the data processing device.

2. Description of the Related Art

As a method for an information processing apparatus to receive information related to a data processing device from the data processing device, there have been proposed a polling method and an event method. According to the event method, when the data processing device satisfies a predetermined condition, the data processing device autonomously transmits information related to the data processing device to the information processing apparatus. Therefore, as compared with the polling method, there is an advantage in that the communication traffic between the information processing apparatus and the data processing device is small.

In recent years, a technology for a Web service has been advanced and an event method based on the Web service is has been conceived. FIG. 23 shows an example of the event method based on the Web service.

A SubScriber 2301 transmits a registration request to an Event Source 2302. When the Event Source 2302 receives the registration request, a Subscription 2303 is generated and stored. The Subscription 2303 includes a notified party address and a type of event desired to be notified. After that, when the predetermined event occurs, the Event Source 2302 transmits a message to notify the occurrence of the event to an Event Sink 2304. The SubScriber 2301 and the Event Sink 2304 may be physically the same terminal or physically different terminals.

For example, the information processing apparatus of an administrator corresponds to the Subscriber 2301 and the Event Sink 2304, and the data processing device corresponds to the Event Source 2302, thereby realizing the management of the data processing device. The management of the data processing device includes management of information such as a state of the data processing device, steps in a data process in the data processing device, activation of the data processing device, and shutdown of the data processing device.

In addition to the above, technologies with use of the event method are proposed (for example, Japanese Patent Laid-Open No. 11-203094 and Japanese Patent Laid-Open No. 2000-137585). According to these technologies as well, the information processing apparatus transmits the registration request of the notified party address to the data processing device, the data processing device stores the notified party address, and when a predetermined condition is satisfied, the notified party address is notified of information related to the data processing device.

However, in the case where the information processing apparatus transmits the registration request of the notified party address to the data processing device and the data processing device stores the notified party address, the following problem exists.

The data processing device has a limitation on a memory that can be utilized, and therefore there is a limitation on the number of the notified party addresses that can be stored. If the number of the information processing apparatuses that transmit the registration request to one data processing device is increased and when the number of such information processing apparatuses exceeds the number of the notified party addresses that can be stored, some notified party addresses cannot be registered in the data processing device.

While the notified party addresses registered in the data processing device are too many and if, for example, a notified party address that is for the administrator of the data processing device is not registered in the data processing device, the management of the data processing device cannot be appropriately performed.

Among the information processing apparatuses used by users, although the users do not need the information related to the data processing device, the registration request is automatically transmitted in some cases at the time of the activation of the information processing apparatus. In such a case, it is more highly possible that the information related to the data processing device is not notified to the notified party that needs the information.

In addition, as the number of the notified party addresses registered in the data processing device is too large, for example, the information processing apparatus different in groups on a network from the data processing device sometimes cannot perform the registration of the notified party address. Such information processing apparatus does not have an occasion to be notified of the information on the data processing device and further cannot receive various services available on the same network group. Although the information related to the data processing device is desired to be received, the information cannot be obtained. For that reason, it is impossible to know the shutdown or rebooting of the data processing device in some cases.

SUMMARY OF THE INVENTION

In view of the above, the present invention realizes such a state that even when the number of information processing apparatuses that transmit a registration request of a notified party address to a data processing device is large, a notified party with a high priority level, for example, an administrator of the data processing device or an information processing apparatus different in groups on a network can be notified of information related to the data processing device.

According to a first aspect of the present invention, a data processing device includes a notified party storage unit configured to store a notified party which is notified of information related to the data processing device; a notification unit configured to notify each notified party stored in the notified party storage unit, of the information related to the data processing device; a reception unit configured to receive from an information processing apparatus a registration request with which registration of the notified party to the notified party storage unit is requested; and a setting unit configured to set at least one of the information processing devices as a specific information processing device, in which the notified party storage unit stores the notified party such that the number of the notified parties registered in accordance with the registration request from information processing device that is not the specific information processing device does not exceed a predetermined number among the number of the notified parties that can be stored in the notified party storage unit.

According to a second aspect of the present invention, a data processing device includes a notified party storage unit configured to store a notified party which is notified of information related to the data processing device; a notification unit configured to notify the information related to the data processing device, of each notified party stored in the notified party storage unit; a reception unit configured to receive from an information processing device a registration request with which registration of the notified party to the notified party storage unit is requested; and a setting unit configured to set at least one of the information processing devices as a specific information processing device, in which when the number of notified parties stored in the notified party storage unit reaches the number of the notified parties that can be stored in the notified party storage unit, the notified party storage unit stores the notified party specified in the registration request from the specific information processing device in place of the notified party registered in accordance with the registration request from the information processing device that is not the specific information processing device, and when the number of the notified parties stored in the notified party storage unit reaches the number of the notified parties that can be stored in the notified party storage unit, the notified party storage unit does not store the notified party specified in the registration request from the information processing device that is not the specific information processing device.

According to a third aspect of the present invention, a data processing device includes a notified party storage unit configured to store a notified party which is notified of information related to the data processing device; a notification unit configured to notify each notified party stored in the notified party storage unit, of the information related to the data processing device; and a reception unit configured to receive from an information processing device a registration request with which registration of the notified party to the notified party storage unit is requested, in which when the number of notified parties stored in the notified party storage unit reaches the number of the notified parties that can be stored in the notified party storage unit, the notified party storage unit stores a notified party designated by the registration request having a first priority level in place of a notified party registered in accordance with the registration request having a second priority level which is lower than the first priority level.

According to a fourth aspect of the present invention, a data processing device includes a notified party storage unit configured to store a notified party which is notified of information related to the data processing device; a notification unit configured to notify each notified party stored in the notified party storage unit, of the information related to the data processing device; and a reception unit configured to receive from an information processing device a registration request with which registration of the notified party to the notified party storage unit is requested, in which when the number of notified parties stored in the notified party storage unit reaches the number of the notified parties that can be stored in the notified party storage unit, the notified party storage unit stores a notified party designated by the registration request from an information processing device which does not belong to a network in a specific range in place of a notified party registered in accordance with the registration request from an information processing device which belongs to the network in the specific range, and when the number of notified parties stored in the notified party storage unit reaches the number of the notified parties that can be stored in the notified party storage unit, the notified party storage unit does not store a notified party designated by the registration request from an information processing device which belongs to the network in the specific range.

Other features, aspects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows an example of event information transmitted by an event transmission unit, according to an exemplary aspect of the present invention.

FIG. 6 shows an example of a notified party address registered in a notified party list (also referred to as "notification list" in the Figures), according to an aspect of the present invention.

FIG. 7 shows a setting screen for setting a priority terminal, according to an exemplary aspect of the present invention.

FIG. 8 shows an example of a notified party list in an initial state, according to an exemplary aspect of the present invention.

FIG. 9 shows an example of the registration request, according to an exemplary aspect of the present invention.

FIG. 10 shows an example of response data, according to an exemplary aspect of the present invention.

FIG. 11 shows an example of the notified party list, according to an exemplary aspect of the present invention.

FIG. 12 is a flowchart showing a data processing method according to a second exemplary embodiment.

FIG. 14 is a flowchart showing a data processing method according to the third embodiment.

FIG. 15 shows an example of the notified party list used in the third embodiment.

FIG. 16 shows an example of the notified party list used in the third embodiment.

FIG. 20 shows an example of the notified party list used in the fifth embodiment.

FIG. 21 shows an example of the registration request used in the fifth embodiment.

FIG. 22 shows an example of the notified party list used in the fifth embodiment.

FIG. 27 shows an example of the notified party list used in the sixth embodiment.

FIG. 28 shows an example of the registration request from the same network used in the sixth embodiment.

FIG. 29 shows an example of the registration request from a different network used in the sixth embodiment.

FIG. 30 shows an example of the notified party list used in the sixth embodiment.

DESCRIPTION OF THE EMBODIMENTS

Hereinafter, a description will be given of preferred embodiments of the present invention with reference to the drawings.

First Exemplary Embodiment

Figure 1:
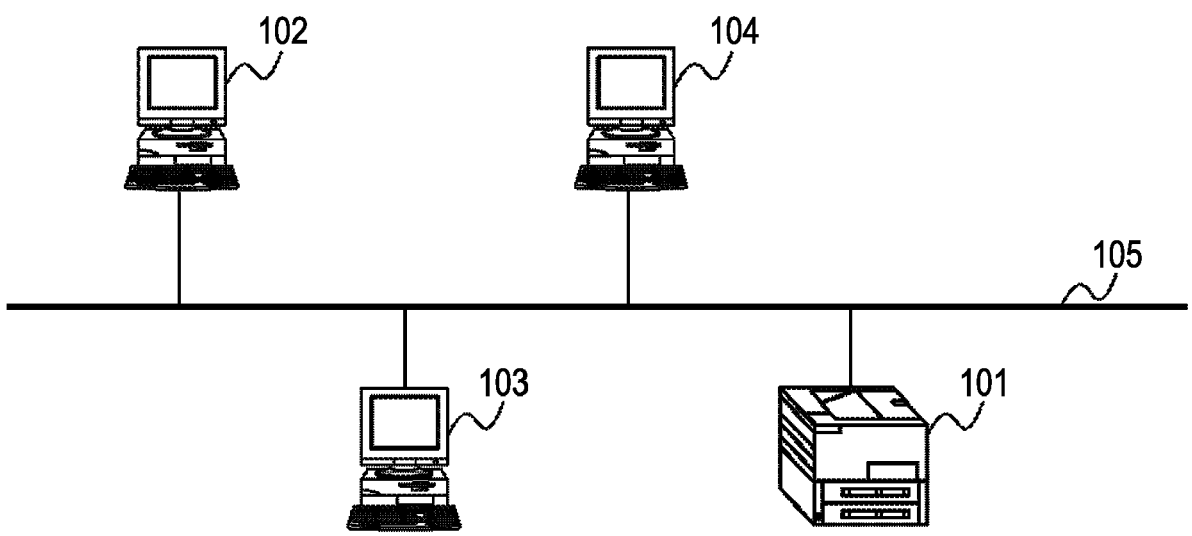
FIG. 1 shows a network system, according to an exemplary aspect of the present invention.

FIG. 1 shows an example network system. In FIG. 1, a printing device 101 functioning as a data processing device, terminals 102 to 104 each of which functions as an information processing apparatus are connected to a network 105. The network 105 is composed, for example, of an LAN (Local Area Network) or a wireless LAN. Each of the terminals 102 to 104 is a personal computer, a laptop computer, a host computer, a work station, or the like.

Figure 2:
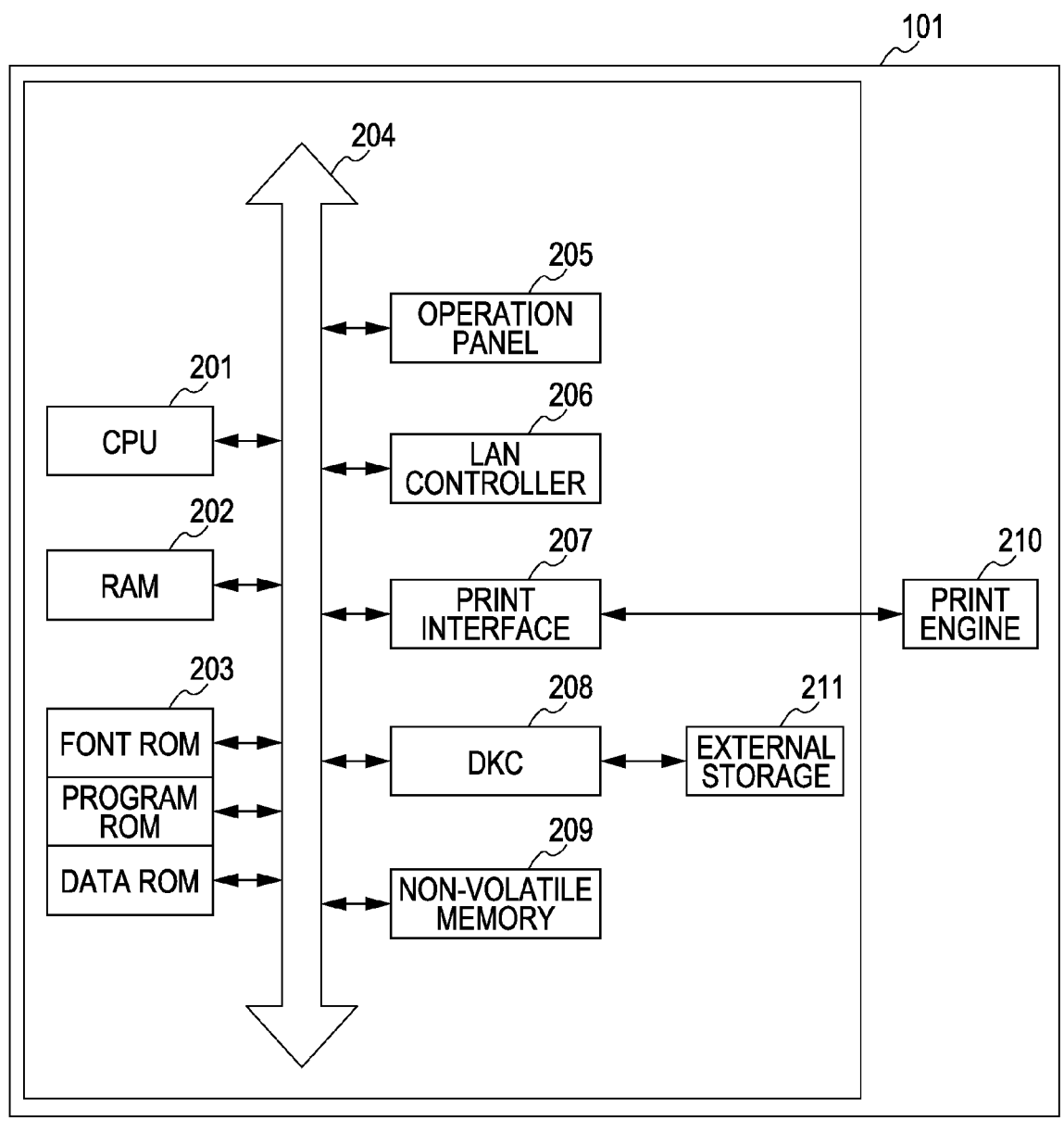
FIG. 2 is a block diagram showing a hardware configuration of a printing device, according to an exemplary aspect of the present invention.

FIG. 2 is a block diagram showing an example hardware configuration of the printing device 101. A description will be given of a laser beam printer as an example of the printing device 101.

A CPU 201 controls, on the basis of a control program stored in a ROM for a program in a ROM 203, various devices that are connected to a system bus 204 in an overall manner. For example, the CPU 201 controls an image signal based on output information so as to be output via a print interface 207 to a print engine 210.

A font ROM in the ROM 203 stores font data (including outline font data) to be used for generating output information. A data ROM in the ROM 203 stores data to be used by each of the terminals 102 to 104. A RAM 202 functions as a main memory or a work memory of the CPU 201. Furthermore, the RAM 202 provides a storage area used for development of the output information and a storage area for storing environment data. When an option RAM is connected to an expansion port not shown in the drawing, a memory capacity of the RAM 202 is expanded.

An operation panel 205 is provided with a soft key or a hard key. A user presses the soft key or the hard key to input various information.

A LAN controller 206 is connected to the network 105 and controls network communication that is performed via the network 105. The CPU 201 can perform a communication process with respect to the terminals 102 to 104 via the LAN controller 206.

The print interface 207 outputs an image signal based on output information to the print engine 210. The print engine 210 prints out an image in accordance with the image signal on a sheet.

A DKC 208 controls an access to a external storage 211. The external storage 211 stores font data, an emulation program, form data, and the like. In addition, the 211 provides a storage area for storing a print job including print data.

The number of external storage 211 is not limited to 1, and another memory device in place of external storage 211 may be prepared. An IC card, a font card, an emulation card, and the like may be connectable to the DKC 208 as external storages. The font card stores font data of a different option from built-in font data. The emulation card stores a program for interpreting a printer control language, which is originally different from a language that can be interpreted by the printing device 101.

A non-volatile memory 209 stores various setting information set by the user via the operation panel.

Although not shown in the drawing, a finisher device for realizing a stable function or a sort function and a duplex printing device for realizing a duplex printing function can be mounted to the printing device 101 as optional devices. These optional devices are controlled by the CPU 201.

Figure 3:
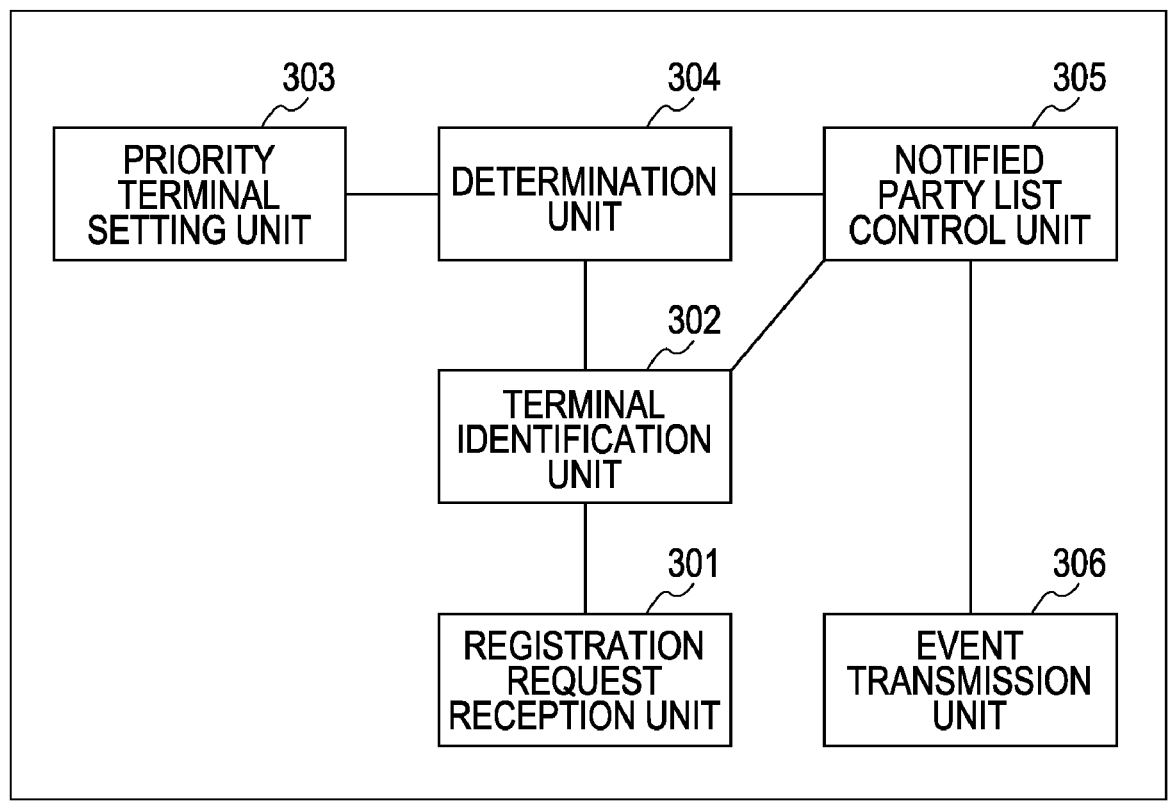
FIG. 3 is a block diagram showing a software configuration of the printing device, according to an exemplary aspect of the present invention.

FIG. 3 is a block diagram showing an example software configuration of the printing device 101.

An event transmission unit 306 transmits event information representing an event that has occurred in the printing device 101 to a notified party address (also referred to as "notification list" in the Figures) registered in a notified party list via the LAN controller 206. As a result, the event transmission unit 306 can notify the external terminals such as the terminals 102 to 104 of the event that has occurred in the printing device 101.

FIG. 5 shows an example of event information transmitted by the event transmission unit 306. The event information of FIG. 5 represents the occurrence of paper jam.

FIG. 6 shows an example of the notified party address registered in the notified party list. In the notified party list, other than the notification address, a notification condition and a validity period are also registered. In addition, a registration ID is allocated to the notified party address registered in the notified party list. The notification address is an address of the transmission destination of the event information. The notified party address is "http://192.168.0.1/EventSink" in FIG. 6. The notified party address may be an address to be used in a protocol that is used for the notification of the event information. For example, an IP address such as "192.168.0.1", an electronic mail address such as "xxx@yyy.com", or a telephone number such as "03-xxx-yyyy" may also be used.

The notification condition is a condition for the event transmission unit 306 to transmit the event information. In FIG. 6, the notification condition is "DeviceStateChanged", and this shows a condition in which when the state of the printing device 101 is changed the state of the printing device 101 is notified.

The validity period refers to a period during which the notified party address is valid. When the validity period of the notified party address has expired, the event transmission unit 306 does not transmit the event information to this notified party address.

Now referring back to FIG. 3, a registration request reception unit 301 receives the registration request of the notified party address transmitted by the external terminals such as the terminals 102 to 104 and transfers the registration request to a terminal identification unit 302.

The terminal identification unit 302 identifies the terminal that has transmitted the registration request, and transfers the registration request and information related to the terminal (hereinafter, referred to as terminal information) to a determination unit 304. The terminal information includes an IP address of the terminal or the like.

In order to set a specific terminal that should have a priority in the registration of the notified party address as a priority terminal, a priority terminal setting unit 303 stores information for identifying the specific terminal (hereinafter, referred to as priority terminal identification information) in the non-volatile memory 209. This priority terminal identification information includes the IP address of the terminal. The registration of the notified party address in accordance with the registration request transmitted from the priority terminal is performed by priority as compared with the registration of the notified party address in accordance with the registration request transmitted from a terminal that is not the priority terminal.

FIG. 7 shows an example setting screen for setting a priority terminal. This setting screen is displayed on the operation panel 205 under the control of the priority terminal setting unit 303. A list 701 is a list of IP addresses of terminals that are set as the priority terminals. When the user desires to add priority terminals, ADD button 702 is pressed to input to an IP address of the terminal. Then, the priority terminal setting unit 303 stores the IP address input by the user in a non-volatile memory 211 as the priority terminal identification information. When the user presses DELETE button 703 after selecting one of the IP addresses in the list 701, the priority terminal setting unit 303 deletes the selected IP address from the priority terminal identification information. When the user presses EDIT button 704 after selecting one of the IP addresses in the list 701, the priority terminal setting unit 303 makes a correction to the selected IP address in accordance with an instruction of the user. When the user presses OK button 705, the priority terminal setting unit 303 closes this setting screen.

The determination unit 304 compares the priority terminal identification information set by the priority terminal setting unit 303 and the terminal information transferred from the terminal identification unit 302 with each other to determine whether or not the terminal that has transmitted the registration request is the priority terminal.

Still referring at FIG. 3, a notified party list control unit 305 determines whether or not there is a free space in the notified party list and stores the notified party address in the notified party list.

FIG. 8 shows an example of the notified party list in an initial state. The notified party list is stored in the non-volatile memory 209 or an external storage 211. Herein, the number of the notified party addresses that can be registered in the notified party list is 6. Two of the notified party addresses are for the priority terminals among the six notified party addresses. The notified party address included in the registration request from the terminal that is not the priority terminal is not registered in an area 801 for the priority terminal, and is only registered in an area 802. In other words, the number of the notified party addresses to be stored in accordance with the registration request from the terminal that is not the priority terminal does not exceed 4.

The number of the notified party addresses that can be registered in the notified party list may be a fixed number or may be changed by the user. Similarly, the number of the notified party addresses that can be registered in the area 801 may be a fixed number or may be changed by the user.

Figure 4:
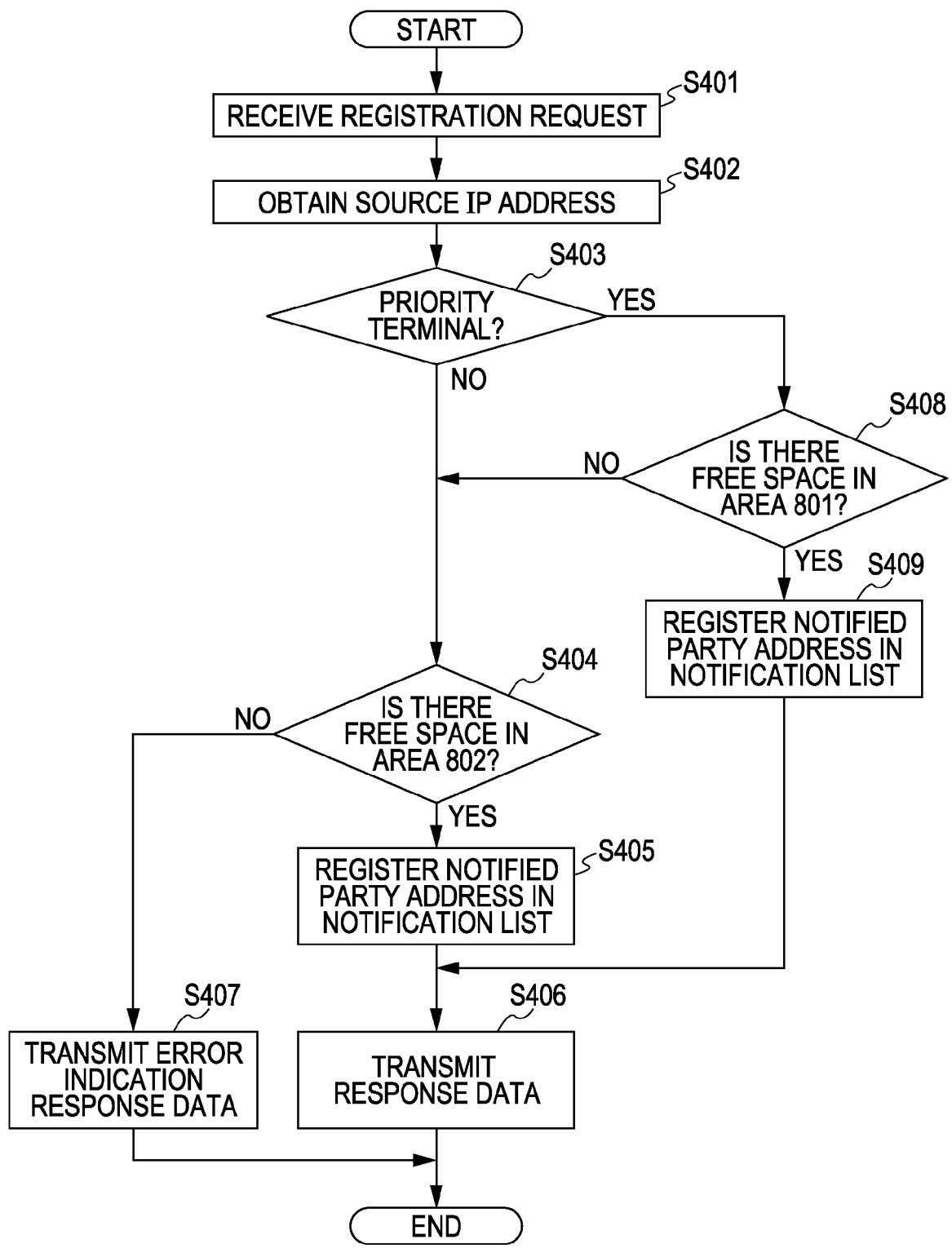
FIG. 4 is a flowchart showing a data processing method performed by the printing device in a case where one of terminals transmits a registration request, according to an exemplary aspect of the present invention.

FIG. 4 is a flowchart showing an example data processing method performed by the printing device 101 in the case where one of the terminals 102 to 104 transmits the registration request. When the CPU 201 executes the control program, this data processing method is performed. Hereinafter, a description will be given of the case where the terminal 102 transmits the registration request.

First, the registration request reception unit 301 receives the registration request from the 102 via the LAN controller 206 (Step S401). The registration request reception unit 301 transmits the registration request to the terminal identification unit 302.

FIG. 9 shows an example of the registration request. The registration request includes a notified party address 901, a notification condition 902, and a validity period 903. In FIG. 9, the notified party address is "http://192.168.0.1/MyEventSink". The notification condition is "DeviceStateChanged", and this shows a condition in which when the state of the printing device 101 is changed, the state of the printing device 101 is notified. The validity period is "PT10M", which means that the period is 10 minutes. It should be noted that this registration request is transmitted on the basis of TCP/IP, a packet header of TCP/IP is added to the registration request, and the packet header includes a source IP address. Herein, the source IP address is an IP address of the terminal 102.

Now referring back to FIG. 4, when the registration request is transmitted from the registration request reception unit 301 to the terminal identification unit 302, the terminal identification unit 302 obtains the source IP address in the packet header that is added to the registration request in order to identify the terminal that has transmitted the registration request (Step S402). Then, the terminal identification unit 302 transmits the registration request and the IP address to the determination unit 304.

Next, the determination unit 304 compares the IP address obtained in Step 1202 and the IP address included in the priority terminal identification information with each other to determine whether or not the terminal 102 that has transmitted the registration request is the priority terminal (Step S403). Then, the determination result and the registration request are transmitted to the notified party list control unit 305.

When the terminal 102 is not the priority terminal, the notified party list control unit 305 determines whether or not there is a free space in the area 802 (Step S404). When there is a free space in the area 802, the notified party list control unit 305 stores the notified party address described in the registration request in the area 802 of the notified party list (Step S405). At this time, a registration ID is allocated in accordance with a place where the notified party address is stored. Along with that, the notified party list control unit 305 stores the notification condition and the validity period described in the registration request in the notified party list. After that, the notified party list control unit 305 transmits the response data corresponding to the registration request to the terminal 102 via the LAN controller 206 (Step S406).

FIG. 10 shows an example of response data. The response data includes a registration ID 1001 and a validity period 1002. The registration ID is designed to be allocated to the notified party address registered in the notified party list, and in FIG. 10 the registration ID is "1". The validity period is "PT10M".

Now referring back to FIG. 4, when it is determined that there is no free space in the area 802 in Step S404, the notified party list control unit 305 transmits response data indicating an error to the terminal 102 via the LAN controller 206 (Step S407). The error indication response data does not include the registration ID or the validity period but includes a message indicating that the notified party address is not registered.

Next, a description will be given of steps executed when the terminal 102 is the priority terminal.

When the terminal 102 is the priority terminal, the notified party list control unit 305 determines whether or not there is a free space in the area 801 (Step S408). When there is a free space in the area 801, the notified party list control unit 305 stores the notified party address described in the registration request in the area 801 of the notified party list (Step S409). At this time, a registration ID is allocated in accordance with a place where the notified party address is stored. Along with that, the notified party list control unit 305 stores the notification condition and the validity period described in the registration request in the notified party list. After that, the notified party list control unit 305 transmits the response data corresponding to the registration request to the terminal 102 via the LAN controller 206 (Step S406).

When it is determined that there is no free space in the area 801 in Step S408, the notified party list control unit 305 advances to Step S404 to make an attempt to register the notified party address described in the registration request in the area 802 in the notified party list.

According to the data processing method shown in FIG. 4, the registration of the notified party address in accordance with the registration request transmitted from the priority terminal is performed by priority as compared with the registration of the notified party address in accordance with the registration request transmitted from a terminal that is not the priority terminal.

For example, in the case where the notified party list is in a state shown in FIG. 11, when the printing device 101 receives the registration request from the priority terminal, the notified party address described in the registration request is stored in the notified party list. The storage location at this time is at an area the registration ID of which is 2. On the other hand, when the printing device 101 receives the registration request from the terminal that is not the priority terminal, the notified party address described in the registration request is not stored in the notified party list.

Second Exemplary Embodiment

According to the first embodiment, the notified party list is separated into the area 801 and the area 802. According to a second embodiment, the notified party list is not separated into these areas, and the number of notified party addresses stored on the basis of the registration request from the terminal that is not the priority terminal is counted.

For the sake of exemplary description, the contents described with reference to FIGS. 1 to 3 and 5 to 10 are similar to those in the second embodiment. It should be noted that in FIG. 8, the notified party list is not separated into the area 801 and the area 802. Instead, a variable X representing the number of notified party addresses stored on the basis of the registration request from the terminal that is not the priority terminal and the maximum number of notified party addresses that can be stored on the basis of the registration request from the terminal that is not the priority terminal (hereinafter, the maximum number is denoted by Y) are provided.

FIG. 12 is a flowchart showing the data processing method performed by the printing device 101 in the case where one of the terminals 102 to 104 transmits the registration request. When the CPU 201 executes the control program, this data processing method is performed. Hereinafter, a description will be given of the case where the terminal 102 transmits the registration request.

In the initial state, X=0 is established. The value of Y may be a fixed number or may be changed by the user.

First, the registration request reception unit 301 receives the registration request from the 102 via the LAN controller 206 (Step S1201). The registration request reception unit 301 transmits the registration request to the terminal identification unit 302.

The terminal identification unit 302 obtains the source IP address in the packet header that is added to the registration request in order to identify the terminal that has transmitted the registration request (Step S1202). Then, the terminal identification unit 302 transmits the registration request and the IP address to the determination unit 304.

Next, the determination unit 304 compares the IP address obtained in Step 1202 and the IP address included in the priority terminal identification information with each other to determine whether or not the terminal 102 that has transmitted the registration request is the priority terminal (Step S1203). Then, the determination result and the registration request are transmitted to the notified party list control unit 305.

When the terminal 102 is the priority terminal, the notified party list control unit 305 determines whether or not there is a free space in the notified party list (Step S1204). When there is a free space in the notified party list, the notified party list control unit 305 stores the notified party address described in the registration request in the notified party list (Step S1205). At this time, a registration ID is allocated in accordance with a place where the notified party address is stored. Along with that, the notified party list control unit 305 stores the notification condition and the validity period described in the registration request in the notified party list. After that, the notified party list control unit 305 transmits the response data corresponding to the registration request to the terminal 102 via the LAN controller 206 (Step S1212).

When it is determined that there is no free space in the notified party list in Step S1204, the notified party list control unit 305 transmits response data indicating an error to the terminal 102 via the LAN controller 206 (Step S1206).

When the terminal 102 is not the priority terminal, the notified party list control unit 305 determines whether or not there is a free space in the notified party list (Step S1207). When there is a free space in the notified party list, the notified party list control unit 305 determines whether or not the variable X is smaller than Y (Step S1209).

When the variable X is smaller than Y, the notified party list control unit 305 stores the notified party address described in the registration request in the notified party list (Step S1210). At this time, a registration ID is allocated in accordance with a place where the notified party address is stored. Along with that, the notified party list control unit 305 stores the notification condition and the validity period described in the registration request in the notified party list.

Furthermore, the notified party list control unit 305 adds the value of the variable X by 1 (Step S1211). After that, the notified party list control unit 305 transmits the response data corresponding to the registration request to the terminal 102 via the LAN controller 206 (Step S1212).

When it is determined that there is no free space in the notified party list in Step S1207, the notified party list control unit 305 transmits response data indicating an error to the terminal 102 via the LAN controller 206 (Step S1208). When it is determined that the variable X is not smaller than Y in Step S1209 as well, the notified party list control unit 305 transmits response data indicating an error to the terminal 102 via the LAN controller 206 (Step S1208).

According to the data processing method shown in FIG. 12, the registration of the notified party address in accordance with the registration request transmitted from the priority terminal is performed by priority as compared with the registration of the notified party address in accordance with the registration request transmitted from a terminal that is not the priority terminal. In other words, the notified party address included in the registration request from the priority terminal is registered in the notified party list as long as there is a free space in the notified party list. However, the notified party address included in the registration request from the terminal that is not the priority terminal is not registered in the notified party list if the variable X is not smaller than Y even when there is a free space in the notified party list.

Third Embodiment

According to the first embodiment, when there is no space in the area 801 or the area 802, the notified party address even based on the registration request transmitted from the priority terminal is not registered. However, according to a third embodiment, even when there is no free space in the notified party list, the notified party address based on the registration request transmitted from the priority terminal may be registered in the notified party list in some cases.

The contents described with reference to FIGS. 1 to 3, 5, 7, 9, and 10 are similar to those in the third embodiment.

FIG. 15 shows an example of the notified party list used in the third embodiment. In the notified party list of the third embodiment, information showing whether or not the registration is made by way of the priority terminal is stored. When the notified party address is registered in accordance with the registration request from the priority terminal, "priority terminal: 1" is established, and when the notified party address is registered in accordance with the registration request from the terminal that is not the priority terminal, "priority terminal: 0" is established. Herein, the number of the notified party addresses that can be registered in the notified party list is 6. Two of the notified party addresses are for the priority terminals among the six notified party addresses. In other words, the number of the notified party addresses that are stored in accordance with the registration request from the terminal that is not the priority terminal does not exceed 4.

The number of the notified party addresses that can be registered in the notified party list may be a fixed number or may be changed by the user. Similarly, the number of the notified party addresses that can be registered in the area 1501 may be a fixed number or may be changed by the user.

Figure 13:
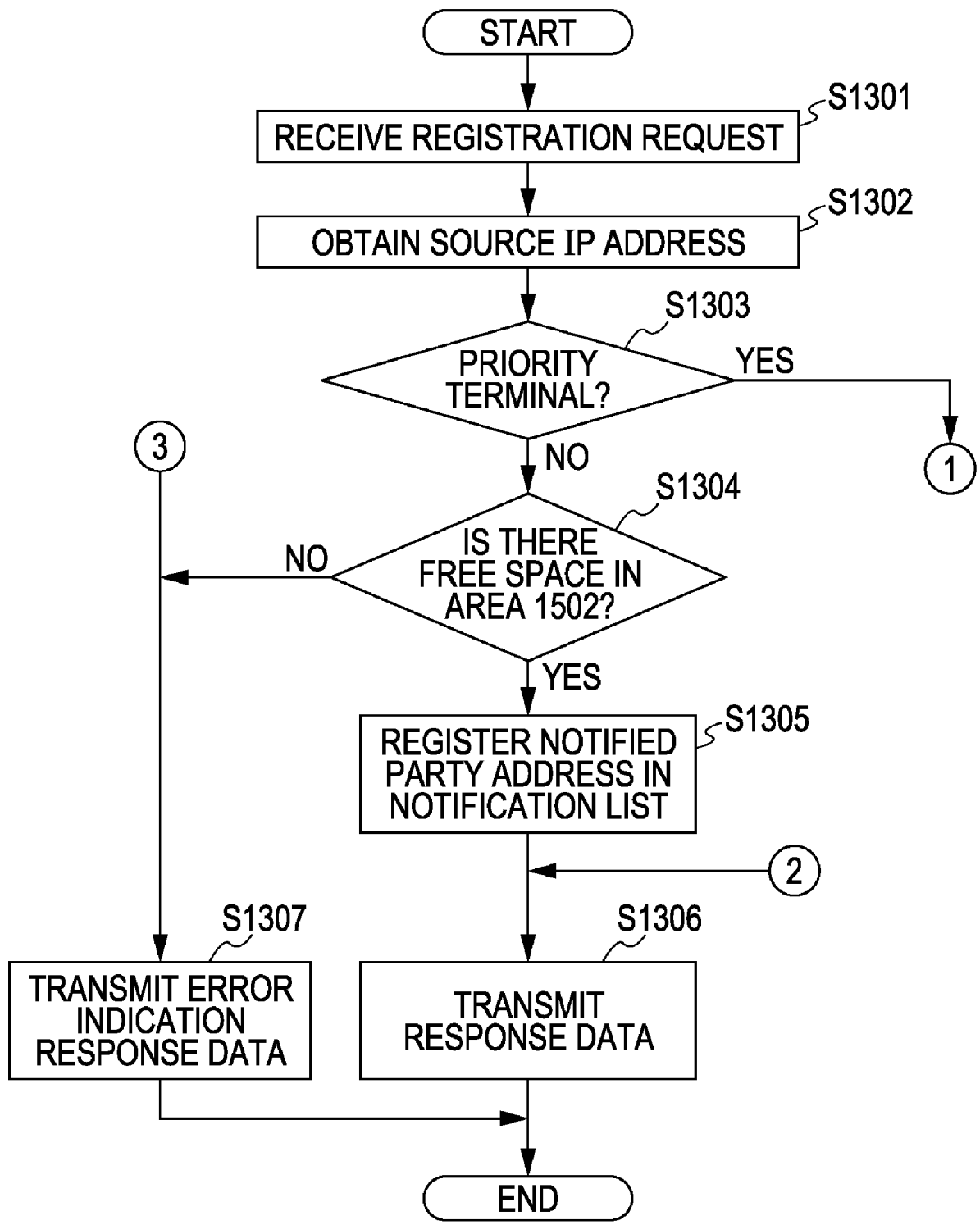
FIG. 13 is a flowchart showing a data processing method according to a third exemplary embodiment.

FIGS. 13 and 14 are flowcharts showing an example data processing method performed by the printing device 101 in the case where one of the terminals 102 to 104 transmits the registration request. When the CPU 201 executes the control program, this data processing method is performed. Hereinafter, a description will be given of the case where the terminal 102 transmits the registration request.

First, the registration request reception unit 301 receives the registration request from the 102 via the LAN controller 206 (Step S1301). The registration request reception unit 301 transmits the registration request to the terminal identification unit 302.

When the registration request is transmitted from the registration request reception unit 301 to the terminal identification unit 302, the terminal identification unit 302 obtains the source IP address in the packet header that is added to the registration request in order to identify the terminal that has transmitted the registration request (Step S1702). Then, the terminal identification unit 302 transmits the registration request and the IP address to the determination unit 304.

Next, the determination unit 304 compares the IP address obtained in Step S1702 and the IP address included in the priority terminal identification information with each other to determine whether or not the terminal 102 that has transmitted the registration request is the priority terminal (Step S1303). Then, the determination result and the registration request are transmitted to the notified party list control unit 305.

When the terminal 102 is not the priority terminal, the notified party list control unit 305 determines whether or not there is a free space in the area 1502 (Step S1304). When there is a free space in the area 1502, the notified party list control unit 305 stores the notified party address described in the registration request in the area 1502 of the notified party list (Step S1305). At this time, a registration ID is allocated in accordance with a place where the notified party address is stored. Along with that, the notified party list control unit 305 stores the notification condition and the validity period described in the registration request in the notified party list. Furthermore, "priority terminal: 0" is stored. After that, the notified party list control unit 305 transmits the response data corresponding to the registration request to the terminal 102 via the LAN controller 206 (Step S1306). FIG. 10 shows an example of the response data transmitted at this time.

When it is determined that there is no free space in the area 1502 in Step S1304, the notified party list control unit 305 transmits response data indicating an error to the terminal 102 via the LAN controller 206 (Step S1307). The error indication response data does not include the registration ID or the validity period but includes a message indicating that the notified party address is not registered.

Next, a description will be given of steps executed when the terminal 102 is the priority terminal. In this case, a data processing method shown in FIG. 14 is performed.

When the terminal 102 is the priority terminal, the notified party list control unit 305 determines whether or not there is a free space in the area 1501 (Step S1308 of FIG. 14). When there is a free space in the area 1501, the notified party list control unit 305 stores the notified party address described in the registration request in the area 1501 of the notified party list (Step S1309). At this time, a registration ID is allocated in accordance with a place where the notified party address is stored. Along with that, the notified party list control unit 305 stores the notification condition and the validity period described in the registration request in the notified party list. Furthermore, "priority terminal: 1" is stored. After that, the notified party list control unit 305 transmits the response data corresponding to the registration request to the terminal 102 via the LAN controller 206 (Step S1306 of FIG. 13).

When it is determined that there is no free space in the area 1501 in Step S1308, the notified party list control unit 305 determines whether or not there is a free space in the area 1502 (Step S1310). When there is a free space in the area 1502, the notified party list control unit 305 stores the notified party address described in the registration request in the area 1502 of the notified party list (Step S1311). Along with that, the notified party list control unit 305 stores the notification condition and the validity period described in the registration request in the notified party list. Furthermore, "priority terminal: 1" is stored. After that, the notified party list control unit 305 transmits the response data corresponding to the registration request to the terminal 102 via the LAN controller 206 (Step S1306 of FIG. 13).

When there is no free space in the area 1501 or the area 1502, the notified party list control unit 305 determines whether or not the notified party address of "priority terminal: 0" is in the area 1502 (Step S1312).

When the notified party address of "priority terminal: 0" is not in the area 1502, the notified party list control unit 305 transmits response data indicating an error to the terminal 102 via the LAN controller 206 (Step S1307 of FIG. 13).

On the other hand, when the notified party address of "priority terminal: 0" is in the area 1502, the notified party list control unit 305 stores, instead of the notified party address, the notified party address described in the registration request received in Step S1301 (Step S1313). In other words, one of the notified party addresses of "priority terminal: 0" that is the notified party address stored in the area 1502 is deleted, and the notified party address described in the registration request received in Step S1301 is stored. Furthermore, the notified party list control unit 305 also stores the notification condition and the validity period described in the registration request received in Step S1301 in the notified party list. In addition, "priority terminal: 1" is stored.

After that, the notified party list control unit 305 transmits the response data corresponding to the registration request to the terminal 102 via the LAN controller 206 (Step S1306 of FIG. 13).

According to the data processing method shown in FIG. 14, the registration of the notified party address in accordance with the registration request transmitted from the priority terminal is performed further by priority as compared with the registration of the notified party address in accordance with the registration request transmitted from a terminal that is not the priority terminal.

For example, in the case where the notified party list is in the state shown in FIG. 16, when the printing device 101 receives the registration request from the priority terminal, the notified party address described in the registration request is stored in the notified party list. Which area the notified party address is stored in among areas with registration IDs 3 to 6 may be determined on the basis of the validity period, a timing when the notified party address is registered, or the like. For example, when the notified party address with the shortest validity period is to be deleted, the notified party address described in the registration request received in Step S1301 is stored in the area the registration ID of which is 5.

In the case where the notified party list is in the state shown in FIG. 16, when the registration request from the terminal that is not the priority terminal is received by the printing device 101, the notified party address described in the registration request is not stored in the notified party list.

Fourth Exemplary Embodiment

According to the third embodiment, the notified party list is separated into the area 1501 and the area 1502. According to a fourth embodiment, the notified party list is not separated into these areas.

The contents described with reference to FIGS. 1 to 3, 5, 7, 9, 10, and 15 are similar to those in the fourth embodiment. It should be noted that in FIG. 15, the notified party list is not separated into the area 1501 and the area 1502.

Figure 17:
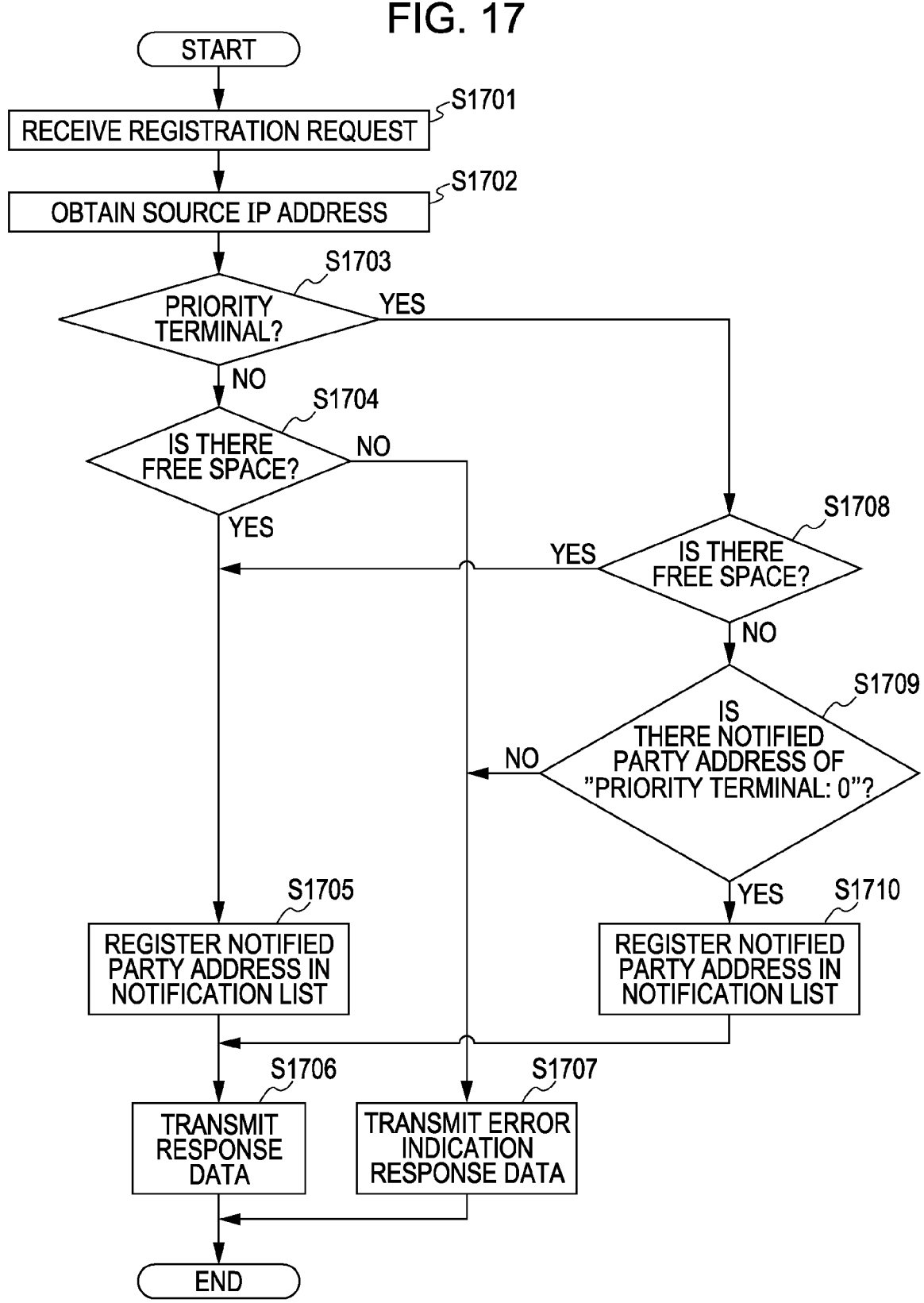
FIG. 17 is a flowchart showing a data processing method according to a fourth exemplary embodiment.

FIG. 17 is a flowchart showing an example data processing method performed by the printing device 101 in the case where one of the terminals 102 to 104 transmits the registration request. When the CPU 201 executes the control program, this data processing method is performed. Hereinafter, a description will be given of the case where the terminal 102 transmits the registration request.

First, the registration request reception unit 301 receives the registration request from the 102 via the LAN controller 206 (Step S1701). The registration request reception unit 301 transmits the registration request to the terminal identification unit 302.

When the registration request is transmitted from the registration request reception unit 301 to the terminal identification unit 302, the terminal identification unit 302 obtains the source IP address in the packet header that is added to the regristration request in order to identify the terminal that has transmitted the regristration request (Step S1702). Then, the terminal identification unit 302 transmits the registration request and the IP address to the determination unit 304.

Next, the determination unit 304 compares the IP address obtained in Step S1702 and the IP address included in the priority terminal identification information with each other to determine whether or not the terminal 102 that has transmitted the registration request is the priority terminal (Step S1703). Then, the determination result and the registration request are transmitted to the notified party list control unit 305.

When the terminal 102 is not the priority terminal, the notified party list control unit 305 determines whether or not there is a free space in the notified party list (Step S1704). When there is a free space in the notified party list, the notified party list control unit 305 stores the notified party address described in the registration request in the notified party list (Step S105). At this time, a registration ID is allocated in accordance with a place where the notified party address is stored. Along with that, the notified party list control unit 305 stores the notification condition and the validity period described in the registration request in the notified party list. In addition, on the basis of the determination result showing whether or not the terminal is the priority terminal, one of "priority terminal: 0" and "priority terminal: 1" is stored.

After that, the notified party list control unit 305 transmits the response data corresponding to the registration request to the terminal 102 via the LAN controller 206 (Step S1706).

When it is determined that there is no free space in the notified party list in Step S1704, the notified party list control unit 305 transmits response data indicating an error to the terminal 102 via the LAN controller 206 (Step S1707).

Next, a description will be given of a process performed in the case where the terminal 102 is the priority terminal.

When the terminal 102 is the priority terminal, the notified party list control unit 305 determines whether or not there is a free space in the notified party list (Step S1708). When there is a free space in the notified party list, the notified party list control unit 305 executes the processes in Steps S1705 and S1706.

On the other hand, when it is determined that there is no free space in the notified party list in Step S1708, the notified party list control unit 305 determines whether or not the notified party address of "priority terminal: 0" is in the notified party list (Step S1709).

When the notified party address of "priority terminal: 0" is not in the notified party list, the notified party list control unit 305 transmits response data indicating an error to the terminal 102 via the LAN controller 206 (Step S1707).

On the other hand, the notified party address of "priority terminal: 0" is in the notified party list, the notified party list control unit 305 stores, instead of the notified party address, the notified party address described in the registration request received in Step S1701 (Step S1710). In other words, one of the notified party addresses of "priority terminal: 0" that is the notified party address stored in the notified party list is deleted, and the notified party address described in the registration request received in Step S1701 is stored. Furthermore, the notified party list control unit 305 stores the notification condition and the validity period described in the registration request received in Step 1701 in the notified party list as well. In addition, "priority terminal: 1" is stored.

After that, the notified party list control unit 305 transmits the response data corresponding to the registration request to the terminal 102 via the LAN controller 206 (Step S1706).

According to the data processing method shown in FIG. 17, the registration of the notified party address in accordance with the registration request transmitted from the priority terminal is performed further by priority as compared with the registration of the notified party address in accordance with the registration request transmitted from a terminal that is not the priority terminal.

Fifth Exemplary Embodiment

According to the first and second embodiments, the priority terminal identification information showing which terminal is the priority terminal is registered in the printing device 101 in advance. According to a fifth embodiment, the registration of the priority terminal identification information is unnecessary and the registration of the notified party address is controlled on the basis of a priority level added to the registration request.

The contents described with reference to FIGS. 1, 2, 5, and 10 are similar to those in the fifth embodiment.

Figure 18:
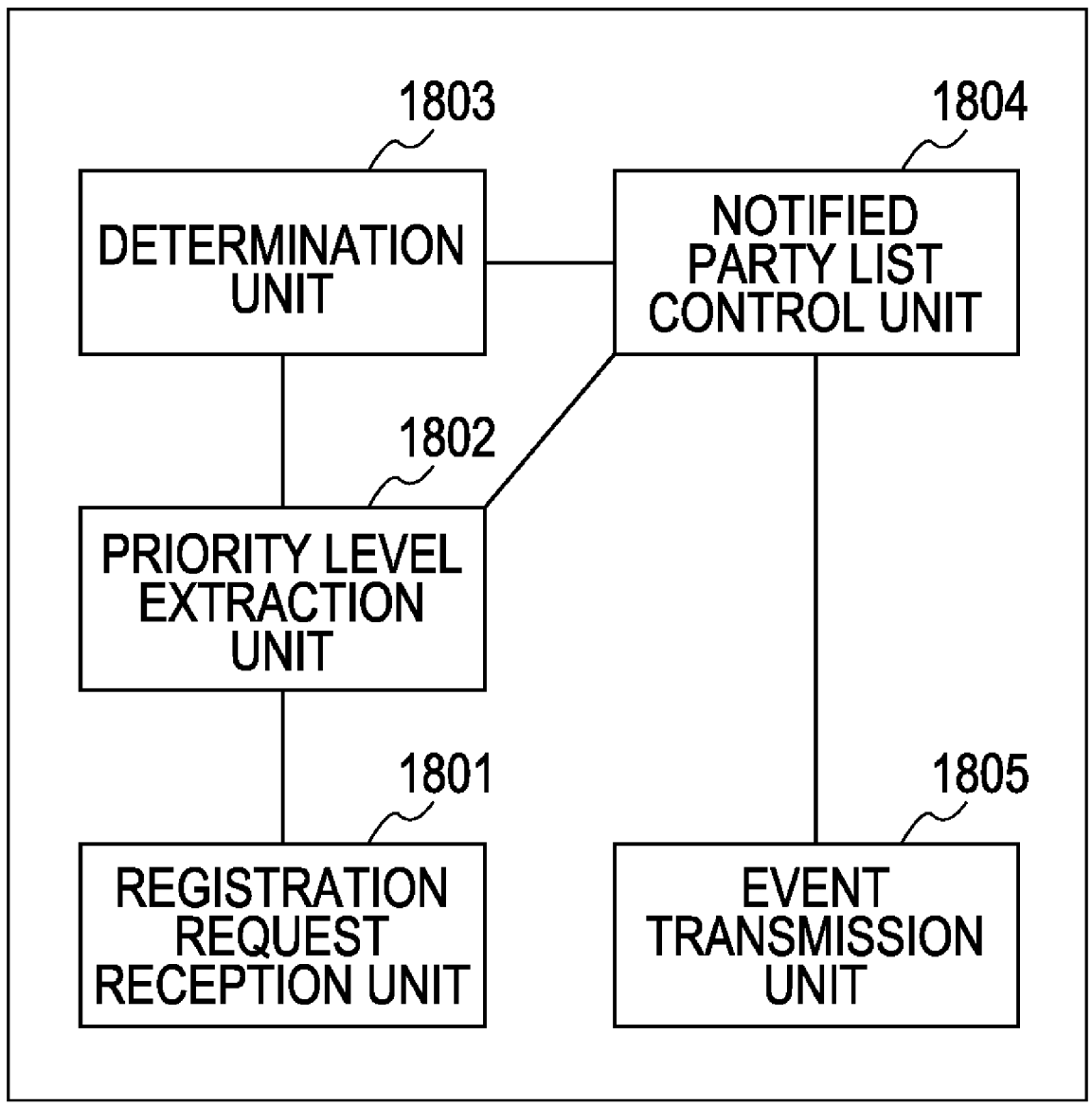
FIG. 18 is a block diagram showing a soft ware configuration of the printing device according to a fifth exemplary embodiment.

FIG. 18 is a block diagram showing a soft ware configuration of the printing device 101 according to the fifth embodiment.

A event transmission unit 1805 transmits event information representing an event that has occurred in the printing device 101 to a notified party address registered in a notified party list via the LAN controller 206. As a result, the event transmission unit 1805 can notify the external terminals such as the terminals 102 to 104 of the event that has occurred in the printing device 101.

A registration request reception unit 1801 receives the registration request of the notified party address transmitted by the external terminals such as the terminals 102 to 104 and transfers the registration request to a priority level extraction unit 1802.

The priority level extraction unit 1802 extracts priority information included in the registration request and transfers the registration request and the priority information to a determination unit 1803 and a notified party list control unit 1804. The priority information shows a priority level related to the registration of the notified party address, and the priority level "1" is higher than the priority level "2". It is desired that a specific terminal, for example, a terminal of an administrator for managing the data processing device only transmits the registration request of the priority level "1" and other terminals transmit the registration request of the priority level "2".

The determination unit 1803 determines the priority level on the basis of the priority information stored in the notified party list.

The notified party list control unit 1804 determines whether or not there is a free area in the notified party list and stores the notified party address in the notified party list.

FIG. 20 shows an example of the notified party list used in the fifth embodiment. In the notified party list according to the fifth embodiment, the priority information showing the priority level is stored. When the priority level of the notified party address is 1, "priority level: 1" is established, and when the priority level of the notified party address is 2, "priority level: 2" is established. Herein, the number of the notified party addresses that can be registered in the notified party list is 6. The number of the notified party addresses that can be registered in the notified party list may be a fixed number or may be changed by the user.

Figure 19:
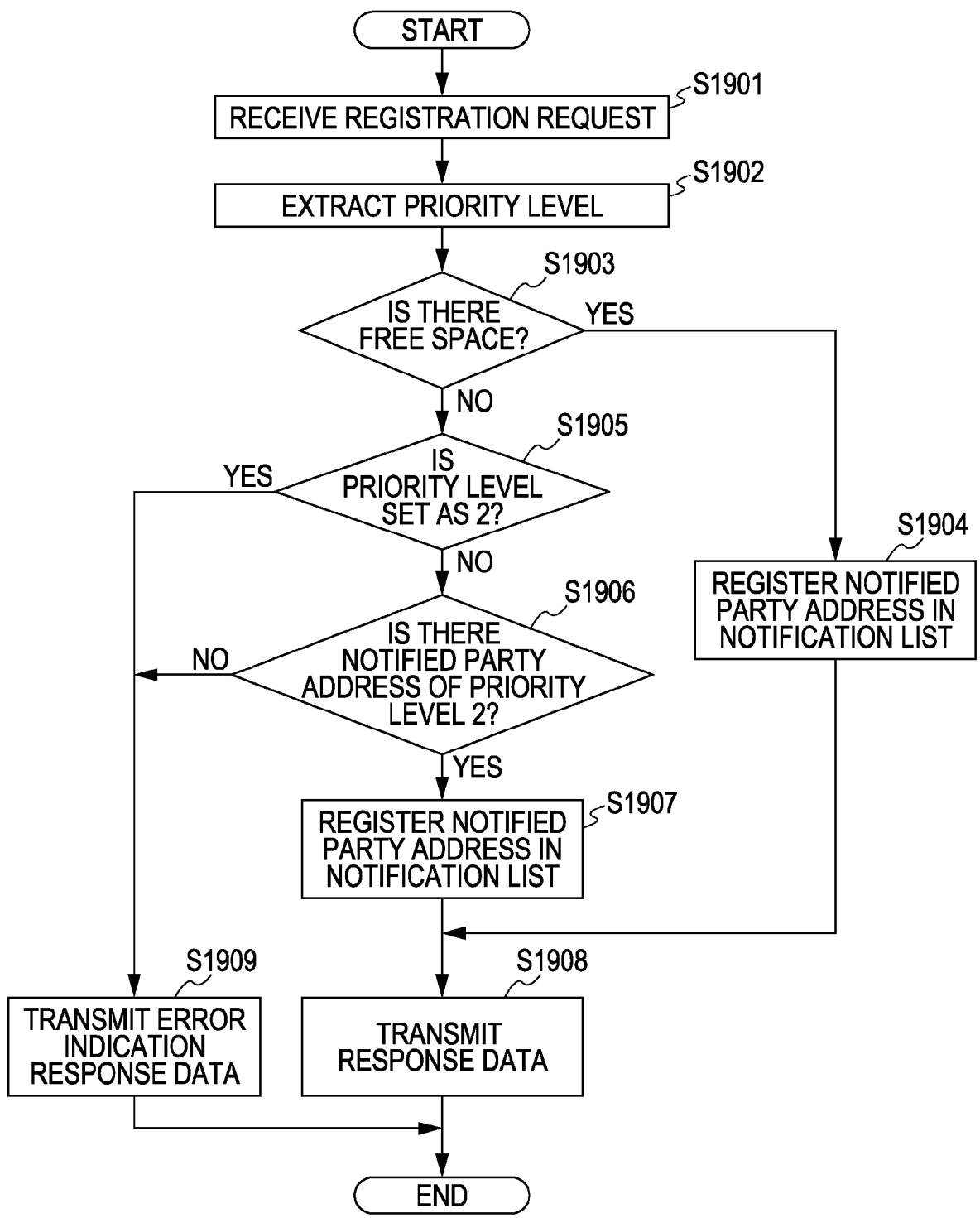
FIG. 19 is a flowchart showing a data processing method according to the fifth embodiment.
Figure 23:
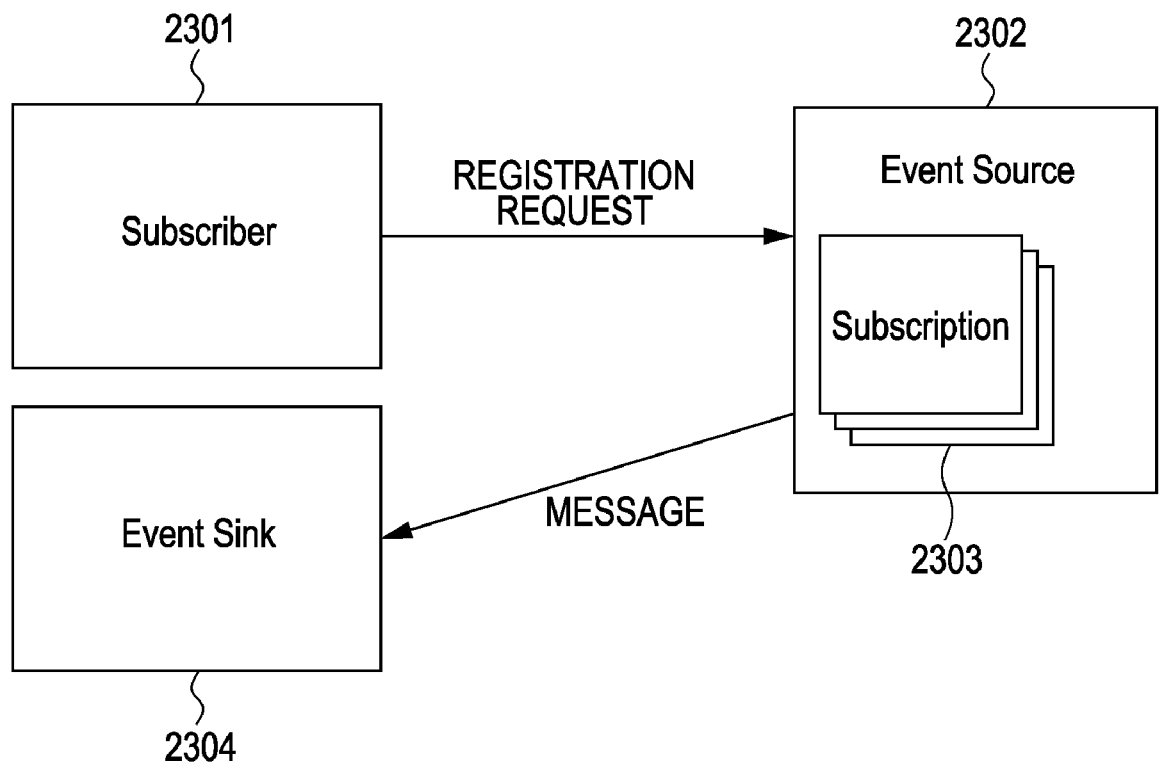
FIG. 23 shows an example of a conventional event method.

FIG. 19 is a flowchart showing the data processing method performed by the printing device 101 in the case where one of the terminals 102 to 104 transmits the registration request. When the CPU 201 executes the control program, this data processing method is performed. Hereinafter, a description will be given of the case where the terminal 102 transmits the registration request.

First, the registration request reception unit 1801 receives the registration request from the terminal 102 via the LAN controller 206 (Step S1901). The registration request reception unit 1801 transmits the registration request to the priority level extraction unit 1802.

FIG. 21 shows an example of the registration request used in the fifth embodiment. The registration request includes a notified party address 2101, a notification condition 2102, a validity period 2103, and a priority level 2104. In FIG. 21, the notified party address is "http://192.168.0.1/MyEventSink". The notification condition is "DeviceStateChanged", and this shows a condition in which when the state of the printing device 101 is changed, the state of the printing device 101 is notified. The validity period is "PT10M", which means that the period is 10 minutes. The priority level is 1.

When the registration request is transmitted from the registration request reception unit 1801 to the priority level extraction unit 1802, the priority level extraction unit 1802 extracts the priority information showing the priority level from the registration request (Step S1902). Then, the priority level extraction unit 1802 transmits the registration request and the priority information to the determination unit 1803 and the notified party list control unit 1804.

At this time, the notified party list control unit 1804 determines whether or not there is a free space in the notified party list (Step S1903). When there is a free space, irrespective of the priority level, the notified party list control unit 1804 stores the notified party address described in the registration request in the notified party list (Step S1904). At this time, a registration ID is allocated in accordance with a place where the notified party address is stored. Along with that, the notified party list control unit 1804 stores the notification condition and the validity period described in the registration request and the priority information extracted by the priority level extraction unit 1802 in the notified party list.

After that, the notified party list control unit 1804 transmits the response data corresponding to the registration request to the terminal 102 via the LAN controller 206 (Step S1908).

When there is no space in the notified party list, the determination unit 1803 determines whether or not the priority level shown in the priority information received from the priority level extraction unit 1802 is "2" (Step S1905). When the priority level is "2", the determination unit 1803 transmits the response data indicating an error to the terminal 102 via the LAN controller 206 (Step S1909).

When the priority level is not "2", the determination unit 1803 notifies the notified party list control unit 1804 of the determination result, and the notified party list control unit 1804 determines whether or not the notified party address of the priority level "2" is in the notified party list (Step S1906). When the notified party address of the priority level "2" is not in the notified party list, the notified party list control unit 1804 transmits the error indication response data to the terminal 102 via the LAN controller 206 (Step S1909).

On the other hand, when the notified party address of the priority level "2" is in the notified party list, the notified party list control unit 1804 stores, instead of the notified party address, the notified party address described in the registration request received in Step S1901 (Step S1907). In other words, one of the notified party addresses of the priority level "2" that is the notified party address stored in the notified party list is deleted, and the notified party address described in the registration request received in Step S1901 is stored. Furthermore, the notified party list control unit 1804 stores the notification condition and the validity period described in the registration request and the priority information extracted by the priority level extraction unit 1802 in the notified party list.

After that, the notified party list control unit 1804 transmits the response data corresponding to the registration request to the terminal 102 via the LAN controller 206 (Step S1908).

According to the data processing method shown in FIG. 17, the registration of the notified party address in accordance with the registration request of the priority level 1 is performed by priority as compared with the registration of the notified party address in accordance with the registration request of the priority level 2.

For example, in the case where the notified party list is in the state shown in FIG. 22, when the printing device 101 receives the registration request of the priority level "1", the notified party address described in the registration request is stored in the notified party list. Which area the notified party address is stored in among areas with registration IDs 3 to 6 may be determined on the basis of the validity period, a timing when the notified party address is registered, or the like. For example, when the notified party address with the shortest validity period is deleted, the notified party address described in the registration request received in Step S1901 is stored in the area the registration ID of which is 5.

In the case where the notified party list is in the state shown in FIG. 22, when the printing device 101 receives the registration request of the priority level "2", the notified party address described in the registration request is not stored in the notified party list.

The number of stages in the priority level is not limited to 2, and more stages may be set. In that case, the determination unit 1803 determines whether or not the priority level shown in the priority information received from the priority level extraction unit 1802 is the lowest priority (Step S1905). Furthermore, the notified party list control unit 1804 determines whether or not there is a notified party address of a priority lower than the priority level shown in the priority information received from the priority level extraction unit 1802 is in the notified party list (Step S1906).

Sixth Exemplary Embodiment

According to the first and second embodiments, the priority terminal identification information showing which terminal is the priority terminal is registered in the printing device 101 in advance. In addition, according to the fifth embodiment, the registration of this priority terminal identification information is necessary, and the registration of the notified party address is controlled in accordance with the priority level added to the registration request. In contrast, according to a sixth embodiment, the advance registration of the priority terminal identification information or the addition of the priority level to the registration request are both unnecessary, and the priority level is automatically determined on the basis of information of a source terminal of a registration request.

The contents described with reference to FIGS. 1, 2, 5, and 10 are similar to those in the sixth embodiment.

Figure 24:
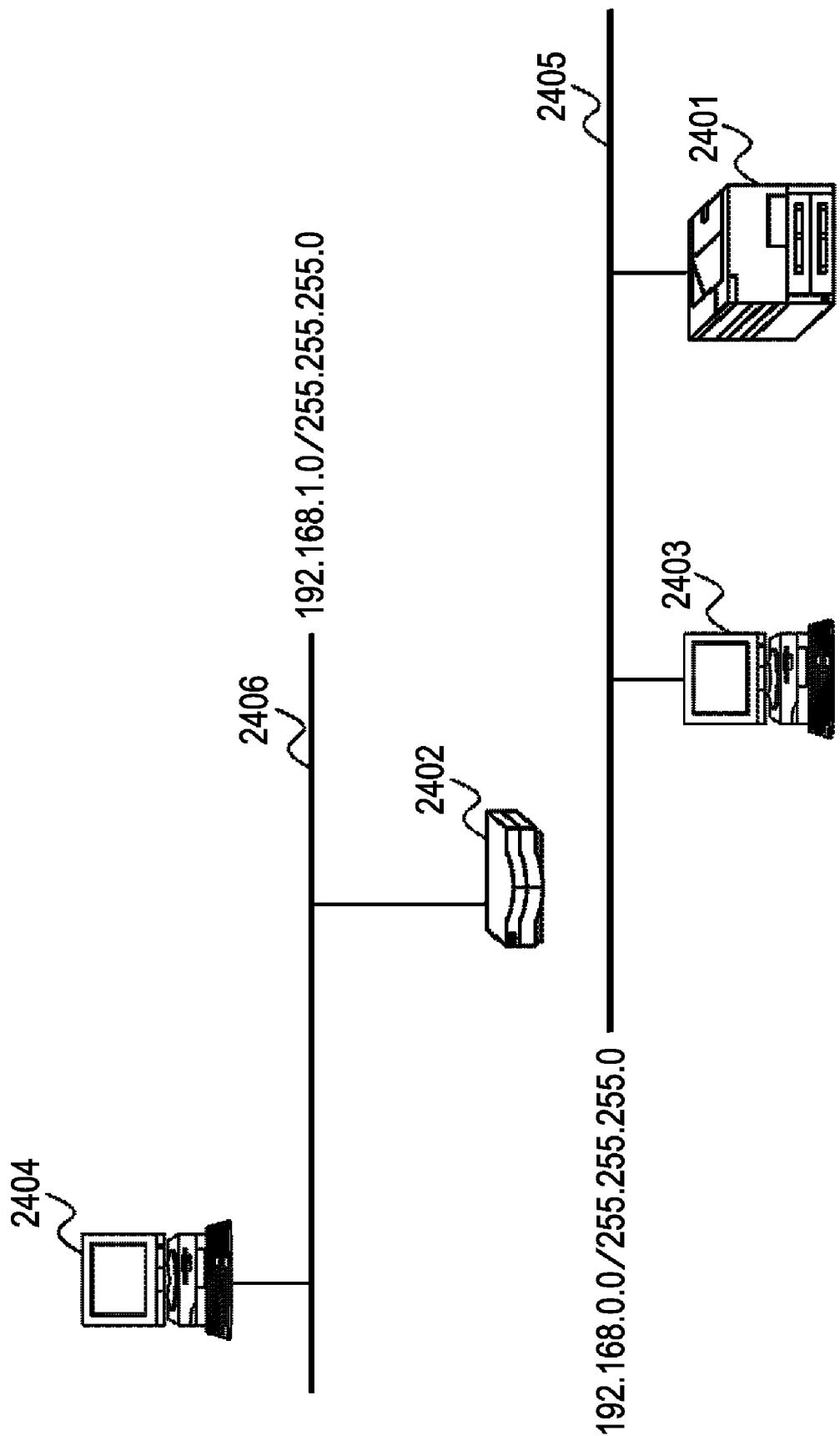
FIG. 24 shows a network system used in a sixth exemplary embodiment.

FIG. 24 shows a network system used in the sixth embodiment. As being different from the first to fifth embodiments, two networks 2405 and 2406 are connected via a network relay device 2402 such as a router. The network 2405 is a subnetwork in which a subnet address is 192.168.0.0 and a subnet mask is 255.255.255.0. The network 2406 is a subnetwork in which a subnet address is 192.168.1.0 and a subnet mask is 255.255.255.0. A printing device 2401 belongs to the subnetwork of 2405 and also belongs to the same network group as that for a terminal device 2403. On the other hand, the printing device 2401 belongs to a different network group from that for a terminal device 2404. Examples of a method for the printing device 2401 to communicate with the terminal device 2403 includes a one-to-one communication method based on unicast and a one-to-many communication method based on broadcast. On the other hand, in order that the printing device 2401 communicates with the terminal device 2404, a router is provided between the devices. The router may not permit communication based on multicast or broadcast in some cases, and therefore in order that the printing device 2401 communicates with the terminal device 2404 with certainty, there is no choice but to use the one-to-one communication method based on unicast via the router.

Figure 25:
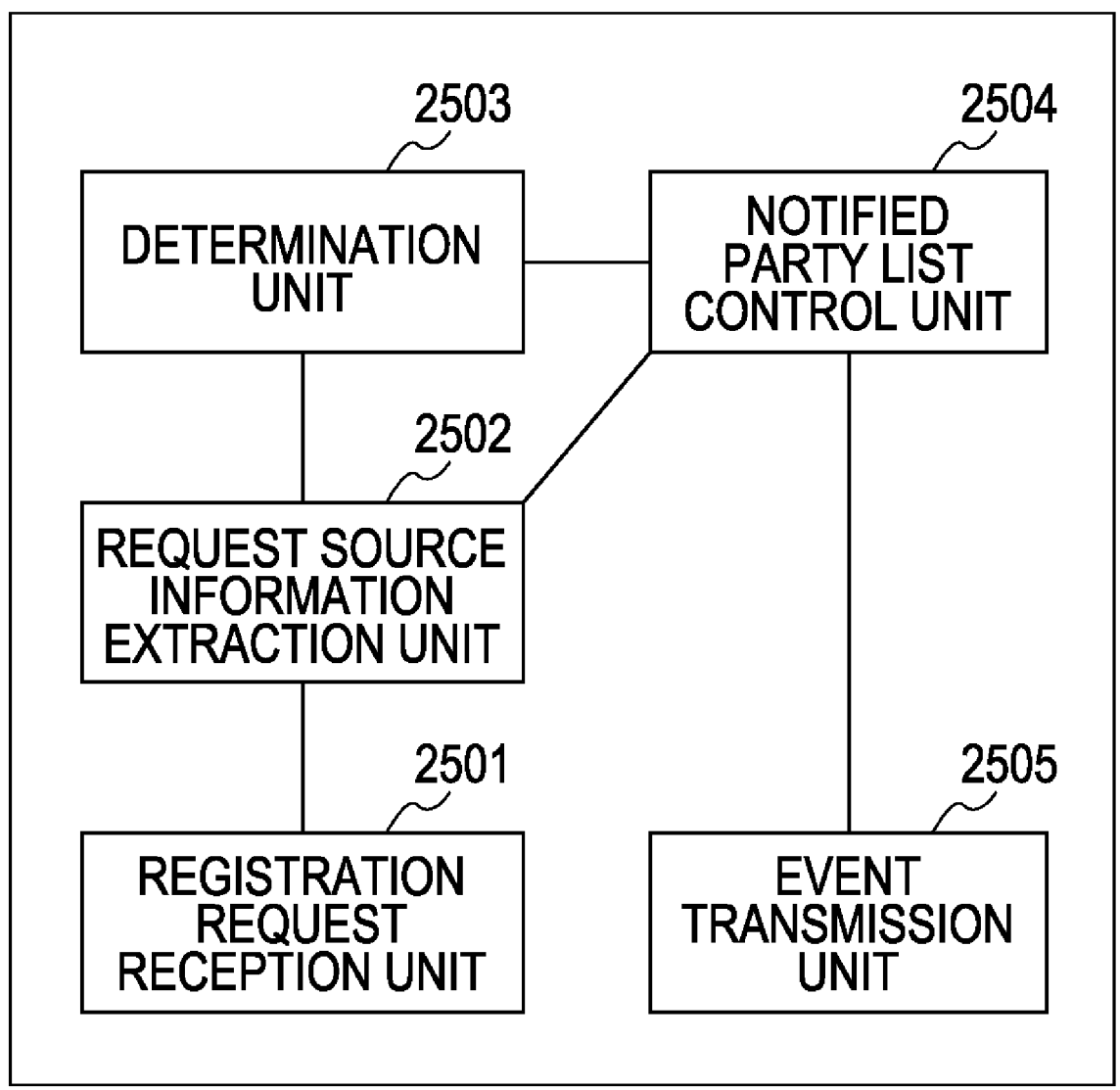
FIG. 25 is a block diagram showing a software configuration of a printing device according to the sixth embodiment.

FIG. 25 is a block diagram showing a software configuration of the printing device 2401 according to the sixth embodiment.

An event transmission unit 2505 transmits event information representing an event that has occurred in the printing device 2401 to a notified party address registered in a notified party list via the LAN controller 206. As a result, the event transmission unit 2505 can notify external terminals such as terminals 2403 and 2404 of the event that has occurred in the printing device 2401.

A registration request reception unit 2501 receives registration request of a notified party address transmitted from the external terminals such as the terminals 2403 and 2404 and transfers the registration request to a request source information extraction unit 2502.

A request source information extraction unit 2502 obtains source information from a message of the registration request (for example, IP address) and transfers the registration request and the source information to a determination unit 2503 and a notified party list control unit 2504. As to the priority level determined on the basis of the source information, for example, the priority level of the terminal 2404 existing on the network 2406 that is different from that for the printing device 2401 is higher than that for the terminal 2403 existing on the same network 2405.

The determination unit 2503 determines whether the priority level is high or low on the basis of the source information of the registration request stored in the notified party list.

The notified party list control unit 2504 is equivalent to the notified party list control unit 1804 in FIG. 18.

FIG. 27 shows an example of the notified party list used in the sixth embodiment. In the notified party list of the sixth embodiment, instead of the priority level in FIG. 20, the source information (for example, the IP address) obtained when the printing device 2401 receives the registration request is recorded. The printing device 2401 determines whether the notified party is on the same network 2405 as that for itself (the printing device 2401) or on the different network 2406 by comparing the IP address of the source where the registration request is transmitted with the IP address of itself (the printing device 2401). To be more specific, the printing device 2401 specifies the subnet address of the source on the basis of the IP address of the source from which the registration request is transmitted and the subnet mask registered in the printing device 2401. Then, the subnet address of itself is specified on the basis of the IP address and the subnet mask of itself. Then, it is determined whether or not those subnet addresses are matched to each other. When those subnet addresses are matched to each other, the notified party and the printing device 2401 are on the same network and when those subnet addresses are not matched to each other, the notified party and the printing device 2401 are not on the same network. Herein, the notified party on the different network has a higher priority level. The determination of the priority level depending the same networks or different networks may be conducted such that the notified party on the different network has a higher priority level or may be conducted such that the notified party on the same network has a higher priority level. In addition, six notified parties can be registered herein, however the number of the notified party addresses that can be registered in the notified party list may be a fixed number or may be changed by the user as in the same case of FIG. 20.

Figure 26:
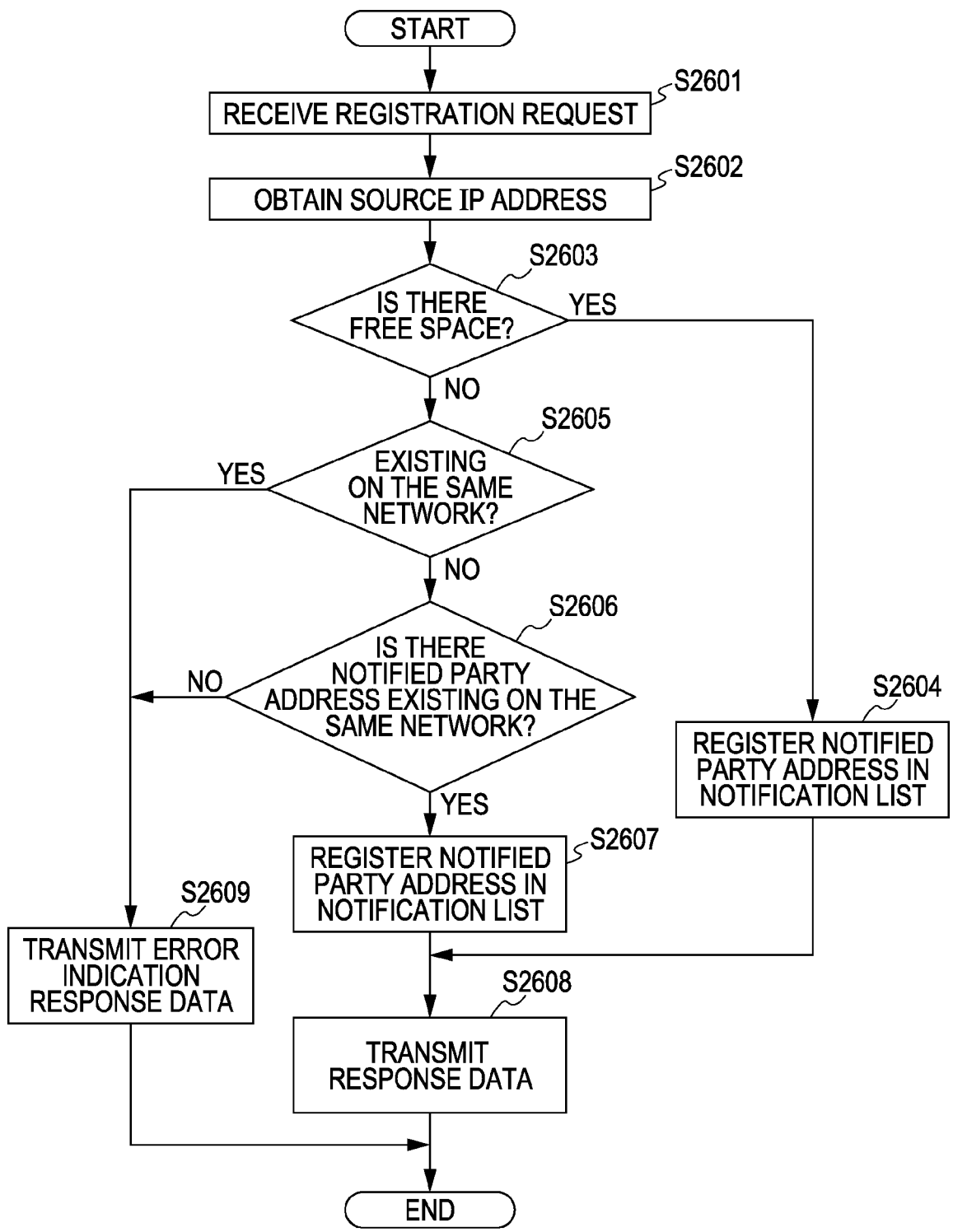
FIG. 26 is a flowchart showing a data processing method according to the sixth embodiment.

FIG. 26 is a flowchart showing an example data processing method performed by the printing device 2401 in a case where one of the terminals 2403 and 2404 transmits a registration request. When the CPU 201 executes the control program, this data processing method is performed. Hereinafter, a description will be given of a case where a terminal 2403 firstly transmits the registration request.

First, the registration request reception unit 2501 receives the registration request from the terminal 2403 via the LAN controller 206 (Step S2601), and the registration request reception unit 2501 transmits the registration request to the request source information extraction unit 2502.

FIGS. 28 and 29 show an example of the registration request from the terminals 2403 and 2404 used in the sixth embodiment. FIG. 28 shows a registration request transmitted from the terminal on the same network as that for the printing device 2401 and FIG. 29 shows a registration request transmitted from the terminal on a different network. As the registration request is described with reference to FIG. 28, the registration request includes a notified party address 2801, a notification condition 2803, a validity period 2802, and a registration request source IP address 2804. Herein, the IP address is used for the registration request source information 2804, but a MAC address, an identifier for identifying a device, a user ID, an ID of a group to which the terminal belongs, or the like may be used. In FIG. 28, the notified party address is "http://192.168.0.1/MyEventSink". The notification condition is "DeviceStateChanged", and this shows a condition in which when the state of the printing device 2401 is changed, the state of the printing device 2401 is notified. The state change of the printing device includes information as to whether or not the printing can be conducted, information as to whether or not the printing device is activated, a notice of the shutdown of the printing device, information as to whether or not the sheet is available, and the like. The validity period is "PT10M", which means that the period is 10 minutes. The registration request source information is "192.168.0.1", which represents that the terminal exists on the same network 2405 as that for the printing device. Herein, the notified party address includes an IP address, which is the same as the registration request source information. However, for example, a name of the DNS or the like is used for some notified party addresses and the IP address may not be used.

When the registration request is transmitted from the registration request reception unit 2501 to the request source information extraction unit 2502, the request source information extraction unit 2502 obtains the registration request source IP address from a message of the registration request (Step S2602). Then, the request source information extraction unit 2502 transmits the registration request and the registration request source IP address to the determination unit 2503 and the notified party list control unit 2504.

At this timing, the notified party list control unit 2504 determines whether or not there is a free space in the notified party list (Step S2603). When there is a free space, without depending on whether or the request source terminal is on the same network or on a different network, the notified party list control unit 2504 stores the notified party address described in the registration request in the notified party list (Step S2604). At this time, the registration ID is allocated in accordance with the location where the notified party address is stored, the notified party list control unit 2504 stores the notification condition and the validity period described in the registration request and the source information extracted by the registration request source information extraction unit 2502 in the notified party list.

After that, the notified party list control unit 2504 transmits response data corresponding to the registration request to the terminal 2403 via the LAN controller 206 (Step S2608).

When there is no free space in the notified party list, the determination unit 2503 determines whether or not, on the basis of the source information received by the registration request source information extraction unit 2501, the source terminal exists on the same network as that for the printing device 2401 (Step S2605). To be more specific, the determination unit 2503 specifies a subnet address of the request source device on the basis of the IP address that is the source information and the subnet mask registered in the printing device 2401. For example, after that, on the basis of the IP address and the subnet mask of itself (the printing device 2401), the subnet address of itself is specified. These subnet addresses are then compared with each other. When the subnet addresses are the same, it is determined that the source terminal and the printing device exist on the same network, and when the subnet addresses are different from each other, it is determined that the source terminal and the printing device do not exist on the same network. When the source terminal and the printing device exist on the same network, it is possible to use other general communication methods such as multicast and broadcast, and therefore it is determined that knowing the information of the printing device is unnecessary and is not registered in the notified party list. Then, the determination unit 2503 transmits the error indication response data to the terminal via the LAN controller 206 (Step S2609).

When the source terminal and the printing device exist on different networks, the determination unit 2503 notifies the notified party list control unit 2504 of the determination result, and the notified party list control unit 2504 determines whether or not the notified party on the same network is registered in the notified party list (Step S2606). When the notified party on the same network is not registered in the notified party list, the notified party list control unit 2504 does not register the notified party address described in the registration request in the notified party list, but transmits the error indication response data to the terminal via the LAN controller 206 (Step S2609).

On the other hand, when the notified party on the same network is registered in the notified party list, the notified party list control unit 2504 stores, instead of the notified party address, the notified party address described in the registration request received in Step S2601 in the notified party list (Step S2607). Herein, as being different from the process of Step S2604, a notified party address that is the notified party address already stored in the notified party list and that exists on the same network as that for the printing device is deleted, and after that, the notified party address that is described in the registration request received in Step S2601 is registered in the notified party list. Furthermore, the notified party list control unit 2504 stores the notification condition and the validity period that are described in the registration request and the source information extracted by the registration request source information extraction unit 2502 in the notified party list.

After that, the notified party list control unit 2504 transmits the response data corresponding to the registration request to the terminal via the LAN controller 206. In addition, data indicating the deletion is transmitted to the notified party that has been deleted from the notified party list via the LAN controller 20 (Step S2608).

According to the data processing method shown in FIG. 26, the registration of the registration request from the terminal on a different network is conducted by priority as compared with the registration of the registration request from the terminal on the same network from the terminal on the same network.

For example, in a case where the notified party list is in a state shown in FIG. 30, when the printing device 2401 receives the registration request whose source is "192.168.5.5", the notified party address described in the registration request is stored in the notified party list. This is because from the source IP address of 192.168.5.5 and the subnet mask of 255.255.255.0, the source subnet address is 192.168.5.0, which is different from the subnet address of the printing device 2401, that is 192.168.0.0. At that time, this is recorded as a replacement while one of the registration IDs 1 and 2 is deleted. Which one of the registration IDs 1 and 2 is deleted may be determined on the basis of the validity period or the timing when the notified party address is registered. For example, when the notified party address with the shortest validity period is deleted, the notified party address that is described in the registration request received in Step S2601 is stored in the area with the registration ID 1.

In a case where the notified party list is in a state shown in FIG. 30, when the printing device 2401 receives the registration request whose source is "192.168.0.10", the notified party address described in the registration request is not stored in the notified party list. This is because from the source IP address of 192.168.0.10 and the subnet mask of 255.255.255.0, the source subnet address is 192.168.0.0, which matches the subnet address of the printing device 2401, that is 192.168.0.0.

According to this embodiment, the IP address is used for the means for determining the priority level, but instead of the IP address, identifying information for identifying a source terminal or a notified party terminal, for example, an MAC address, an identifier for identifying a device such as UUID, a user ID, an identifier to which the terminal belongs, or the like may be used. In addition, according to this embodiment, the example where the registration request source IP address 2804 is included in the registration request has been described, but the registration request may not include this information. In that case, it is possible to find out the registration request source IP address while the printing device 2401 refers to a header of the received registration request packet.

Also, according to this embodiment, the subnet address of the registration requesting device and that of the printing device are compared with each other to determine whether or not the devices are on the same network, but the present invention is not limited to the above. The determination by the printing device as to whether or not the printing device and the registration requesting device are on the same network through the comparison of the subnet addresses is one of examples of the determination as to whether or not the registration requesting device belongs to a network within a specific range. In this case, the network within a specific range is equivalent to a network the subnet address of which is the same as that of the printing device.

The network within a specific range may be a network other than the above.

For example, the network within a specific range may refer to a range where data transmitted from the printing device by way of broadcast or multicast can be reached. In this case, the printing device determines whether the registration requesting device belongs to the range where the data transmitted by way of broadcast or multicast from the printing device can be reached, and when the registration requesting device does not belong to the range, the priority level to be registered in the notified party list is set high. That is, even when there is no free space in the notified party list, the device not belonging to the range where the data transmitted by way of broadcast or multicast can be reached is registered in the notified party list by priority.

In addition, according to this embodiment, the printing device obtains the registration request source IP address from the message of the registration request. However, for the information used for the determination, the notified party address included in the message of the registration request may be used instead of the registration request source IP address. That is, it may be determined as to whether or not the device designated as the notified party belongs to the network in the specific range. With the above-mentioned configuration, even when the registration requesting device and the device at the notified party are different from each other, it is possible to prevent the leak from the notified party list. In particular, when the registration requesting device belongs to the network in the specific range and the device at the notified party does not belong to the network in the specific range, a higher effect is achieved.

Other Exemplary Embodiments

The present invention may be applied to a system composed of a plurality of devices or to an apparatus formed of a single device. In addition, the printing device according to the above-mentioned embodiments may also be a device such as a multifunctional machine, a copying machine, a scanner, or a facsimile machine, which functions as a data processing device.

Furthermore, according to the present invention, a recording medium on which a program code of a software for realizing the flowchart of the above-mentioned embodiments may be supplied to a system or a device. The present invention can also be realized when a computer (a CPU or an MPU) provided to the system or the device reads out and executes the program code stored in the recording medium.

In this case, the program code itself read out from the recording medium realizes the function of the embodiments, and a storage medium storing the program code constitutes the present invention.

For the storage medium for supplying the program code, for example, a Floppy disc, a hard disc, an optical disc, an opto-magnetic disc, a CD-ROM, a CD-R, a DVD-ROM, a magnetic tape, a non-volatile memory card, a ROM, or the like can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-091232 filed Mar. 29, 2006 and No. 2006-337160 filed Dec. 14, 2006, which are hereby incorporated by reference herein in their entirety.

What is claimed is:

1. A data processing device, comprising:
a processing unit;
a memory;
a notified party storage unit configured to store a notified party which is notified of information related to the data processing device;

a notification unit configured to notify each notified party stored in the notified party storage unit, of the information related to the data processing device;
a reception unit configured to receive from a plurality of information processing devices a registration request with which registration of the notified party to the notified party storage unit is requested; and
a setting unit configured to set at least one of the plurality of information processing devices as a specific information processing device,
wherein the notified party storage unit stores the notified party such that the number of the notified parties registered in accordance with the registration request from information processing device that is not the specific information processing device does not exceed a predetermined number among the number of the notified parties that can be stored in the notified party storage unit,
wherein the notified party storage unit has a first area for storing the notified party registered in accordance with the registration request from the specific information processing device and a second area for storing the notified party registered in accordance with the registration request from an information processing device that is not the specific information processing device, and the notified party specified in the registration request from the specific information processing device can be stored in the second area but the notified party specified in the registration request from the information processing device that is not the specific information processing device cannot be stored in the first area.

2. A data processing device, comprising:
a processing unit;
a memory;
a notified party storage unit configured to store a notified party which is notified of information related to the data processing device;
a notification unit configured to notify each notified party stored in the notified party storage unit, of the information related to the data processing device;
a reception unit configured to receive from a plurality of information processing devices a registration request with which registration of the notified party to the notified party storage unit is requested;
a setting unit configured to set at least one of the plurality of information processing devices as a specific information processing device; and
a count unit configured to count the number of notified parties registered in accordance with the registration request from the information processing device that is not the specific information processing device, wherein when the number counted by the count unit reaches the predetermined number even in a case where the number of notified parties stored in the notified party storage unit does not reach the number of notified parties that can be stored in the notified party storage unit, the notified party is not stored in the notified party storage unit in accordance with the registration request from the information processing device that is not the specific information processing device, and when the number of notified parties stored in the notified party storage unit does not reach the number of notified parties that can be stored in the notified party storage unit, the notified party is stored in the notified party storage unit in accordance with the registration request from the specific information processing device,
wherein the notified party storage unit stores the notified party such that the number of the notified parties registered in accordance with the registration request from information processing device that is not the specific information processing device does not exceed a predetermined number among the number of the notified parties that can be stored in the notified party storage unit.

3. A data processing device, comprising:
a processing unit;
a memory;
a notified party storage unit configured to store a notified party which is notified of information related to the data processing device;
a notification unit configured to notify the information related to the data processing device, of each notified party stored in the notified party storage unit;
a reception unit configured to receive from an information processing device a registration request with which registration of the notified party to the notified party storage unit is requested; and
a setting unit configured to set at least one of the information processing devices as a specific information processing device,
wherein when the number of notified parties stored in the notified party storage unit reaches the number of the notified parties that can be stored in the notified party storage unit, the notified party storage unit stores the notified party specified in the registration request from the specific information processing device in place of the notified party registered in accordance with the registration request from the information processing device that is not the specific information processing device, and when the number of the notified parties stored in the notified party storage unit reaches the number of the notified parties that can be stored in the notified party storage unit, the notified party storage unit does not store the notified party specified in the registration request from the information processing device that is not the specific information processing device.

4. The data processing device according to claim 3, wherein the notified party storage unit has a first area for storing the notified party registered in accordance with the registration request from the specific information processing device and a second area for storing the notified party registered in accordance with the registration request from an information processing device that is not the specific information processing device, and when the number of notified parties stored in the notified party storage unit reaches the number of the notified parties that can be stored in the notified party storage unit, the notified party storage unit stores the notified party specified in the registration request from the specific information processing device in place of the notified party stored in the second area in accordance with the registration request from the information processing device that is not the specific information processing device.

5. The data processing device according to claim 3, wherein the notified party storage unit associates one of information indicating that the notified party is stored in accordance with the registration request from the specific information processing device and information indicating that the notified party is stored in accordance with the registration request from the information processing device that is not the specific information processing device, to the notified party stored in the notified party storage unit for storage.

6. A data processing device, comprising:
a processing unit;
a memory;

a notified party storage unit configured to store a notified party which is notified of information related to the data processing device;

a notification unit configured to notify each notified party stored in the notified party storage unit, of the information related to the data processing device; and a reception unit configured to receive from an information processing device a registration request with which registration of the notified party to the notified party storage unit is requested, wherein when the number of notified parties stored in the notified party storage unit reaches the number of the notified parties that can be stored in the notified party storage unit, the notified party storage unit stores a notified party designated in accordance with the registration request having a first priority level in place of a notified party registered in accordance with the registration request having a second priority level which is lower than the first priority level, wherein the notified party storage unit associates priority information indicating the priority level that the registration request has, to the notified party stored in the notified party storage unit for storage.

7. A data processing device, comprising:

a processing unit;

a memory;

a notified party storage unit configured to store a notified party which is notified of information related to the data processing device;

a notification unit configured to notify each notified party stored in the notified party storage unit, of the information related to the data processing device; and a reception unit configured to receive from an information processing device a registration request with which registration of the notified party to the notified party storage unit is requested, wherein when the number of notified parties stored in the notified party storage unit reaches the number of the notified parties that can be stored in the notified party storage unit, the notified party storage unit stores a notified party designated by the registration request from an information processing device which does not belong to a network in a specific range in place of a notified party registered in accordance with the registration request from an information processing device which belongs to the network in the specific range, and when the number of notified parties stored in the notified party storage unit reaches the number of the notified parties that can be stored in the notified party storage unit, the notified party storage unit does not store a notified party designated by the registration request from an information processing device which belongs to the network in the specific range.

8. The data processing device according to claim 7, further comprising:

an extraction unit configured to extract address information of an information processing device from the registration request received by the reception unit; and a determination unit configured to determine whether or not the information processing device belongs to the network in the specific range on the basis of the address information extracted by the extraction unit.

9. The data processing device according to claim 8, the determination unit determines that the information processing device belongs to the network in the specific range when a subnet address which is identified from the address information extracted by the extraction unit and a subnet mask and a subnet address which is identified from address information of the data processing device and a subnet mask are matched to each other, and when the subnet addresses are different from each other, the determination unit determines that the information processing device does not belong to the network in the specific range.

10. The data processing device according to claim 7, wherein the network in the specific range includes a network having a same subnet address of that for the data processing device.

11. A data processing method performed by a data processing device which includes a processing unit, a memory, a notification unit, and a reception unit, the method comprising:

via the notification unit, notifying each notified party stored in a notified party list, of information related to the data processing device;

via the reception unit, receiving from an information processing device a registration request with which registration of the notified party in the notified party list is requested; and performing such a control that when the number of notified parties stored in the notified party list reaches the number of notified parties that can be stored in the notified party list, a notified party designated in accordance with the registration request from an information processing device which does not belong to a network in a specific range is stored in the notified party list in place of a notified party registered in accordance with the registration request from an information processing device which belongs to the network in t he specific range, and when the number of notified parties stored in the notified party list reaches the number of notified parties that can be stored in the notified party list, a notified party designated in accordance with the registration request from an information processing device which belongs to the network in the specific range is not registered in the notified party list.

12. A data processing method performed by a data processing device which includes a processing unit, a memory, a notification unit, a reception unit, and a setting unit, the method comprising:

via the notification unit, notifying each notified party registered in a notified party list, of information related to the data processing device;

via the reception unit, receiving from an information processing device a registration request with which registration of the notified party in the notified party list is requested;

via the setting unit, setting at least one of the information processing devices as a specific information processing device; and performing such a control that when the number of notified parties stored in the notified party list reaches the number of notified parties that can be stored in the notified party list, the notified party specified in the registration request from the specific information processing device is registered in the notified party list in place of the notified party registered in accordance with the registration request from the information processing device that is not the specific information processing device, and when the number of notified parties stored in the notified party list reaches the number of notified parties that can be stored in the notified party list, the notified party specified in the registration request from the information processing device that is not the specific information processing device is not registered in the notified party list.

13. A data processing method performed by a data processing device which includes a processing unit, a memory, a notification unit, and a reception unit, the method comprising:
   via the notification unit, notifying each notified party stored in a notified party list, of information related to the data processing device;
   via the reception unit, receiving from an information processing device a registration request with which registration of the notified party in the notified party list is requested; and
   performing such a control that when the number of notified parties stored in the notified party list reaches the number of notified parties that can be stored in the notified party list, a notified party designated in accordance with the registration request from an information processing device which does not belong to a network in a specific range is stored in the notified party list in place of a notified party registered in accordance with the registration request from an information processing device which belongs to the network in the specific range, and when the number of notified parties stored in the notified party list reaches the number of notified parties that can be stored in the notified party list, a notified party designated in accordance with the registration request from an information processing device which belongs to the network in the specific range is not registered in the notified party list.

* * * * *